(12) United States Patent
Yokomakura et al.

(10) Patent No.: US 9,860,880 B2
(45) Date of Patent: Jan. 2, 2018

(54) TERMINAL DEVICE, BASE STATION DEVICE, INTEGRATED CIRCUIT AND COMMUNICATION METHOD

(71) Applicant: Sharp Kabushiki Kaisha, Osaka-shi, Osaka (JP)

(72) Inventors: Kazunari Yokomakura, Osaka (JP); Tatsushi Aiba, Osaka (JP); Shoichi Suzuki, Osaka (JP); Hiroki Takahashi, Osaka (JP); Wataru Ouchi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 74 days.

(21) Appl. No.: 14/421,186

(22) PCT Filed: Jul. 2, 2014

(86) PCT No.: PCT/JP2014/067666
§ 371 (c)(1),
(2) Date: Feb. 12, 2015

(87) PCT Pub. No.: WO2015/002237
PCT Pub. Date: Jan. 8, 2015

(65) Prior Publication Data
US 2015/0245346 A1 Aug. 27, 2015

(30) Foreign Application Priority Data
Jul. 5, 2013 (JP) .................................. 2013-141554

(51) Int. Cl.
*H04W 4/00* (2009.01)
*H04W 72/04* (2009.01)
(Continued)

(52) U.S. Cl.
CPC ........... *H04W 72/0413* (2013.01); *H04L 5/00* (2013.01); *H04L 5/0057* (2013.01); *H04W 24/10* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2010/0285809 A1* 11/2010 Lindstrom .............. H04L 5/001
455/450
2011/0249578 A1* 10/2011 Nayeb Nazar ........ H04L 1/0027
370/252
(Continued)

OTHER PUBLICATIONS

U.S. Appl. No. 61/706,610 Provisional Specification.*
(Continued)

*Primary Examiner* — Siren Wei
(74) *Attorney, Agent, or Firm* — Keating & Bennett, LLP

(57) ABSTRACT

There is provided a terminal device that communicates with a base station device. The terminal device includes a reception unit that receives downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered
(Continued)

in a case that the report of the channel state information is triggered by a third value in the field of the first information.

12 Claims, 26 Drawing Sheets

(51) Int. Cl.
H04W 24/10 (2009.01)
H04W 72/12 (2009.01)
H04L 5/00 (2006.01)
H04W 88/08 (2009.01)
H04L 5/14 (2006.01)

(52) U.S. Cl.
CPC ..... *H04W 72/042* (2013.01); *H04W 72/0446* (2013.01); *H04W 72/12* (2013.01); *H04L 5/0073* (2013.01); *H04L 5/1469* (2013.01); *H04W 88/08* (2013.01)

(56) References Cited

U.S. PATENT DOCUMENTS

2012/0093119 A1* 4/2012 Kim .................... H04L 27/2613
370/329
2012/0257524 A1* 10/2012 Chen .................... H04W 24/10
370/252
2014/0086084 A1* 3/2014 Bi ......................... H04L 1/0026
370/252

OTHER PUBLICATIONS

Ericsson et al., "On standardization impact of TDD UL-DL adaptation", 3GPP TSG-RAN WG1 #69, R1-122016, May 21-25, 2012, pp. 1-3.
Ericsson et al., "Signalling support for dynamic TDD", 3GPP TSG-RAN WG1 #72, R1-130558, Jan. 28-Feb. 1, 2013, pp. 1-3.
3GPP TS 36.213 V11.2.0, "3rd Generation Partnership Project; Technical Specification Group Radio Access Network; Evolved Universal Terrestrial Radio Access (E-UTRA); Physical layer procedures (Release 11)," Feb. 2013, pp. 1-173.
LG Electronics, "Air Interface Support for ICIC in Dynamic TDD UL-DL Reconfigurations;" 3GPP TSP RAN WG1 Meeting #73; R1-132226; May 11, 2013; 6 pages.
Samsung, "DL Subframe Set Based Mechanism to Support TDD UL-DL Reconfiguration;" 3GPP TSG RAN WG1 #73; R1-131968; May 11, 2013; 3 pages.
Dahlman, E. et al.; "4G LTE/LTE-Advanced for Mobile Broadband—Chapter 10;" Mar. 29, 2011; pp. 143-202.

* cited by examiner

FIG. 9

| UPLINK-DOWNLINK CONFIGURATION | DOWNLINK-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 12

| SET # | (PRIMARY CELL UL-DL CONFIGURATION, SECONDARY CELL UL-DL CONFIGURATION) | SECONDARY CELL SECOND UPLINK REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 14

| SET # | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02,),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 16

| CONDITION | FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|---|
| (d) | D | D | D |
| (e) | U | U | U |
| (f) | U | D | U or D |
| (g) | S | S | S |
| (h) | S | D | S or D |

FIG. 17

| FIRST UPLINK REFERENCE UL-DL CONFIGURATION | FIRST DOWNLINK REFERENCE UL-DL CONFIGURATION | TRANSMISSION DIRECTION UL-DL CONFIGURATION |
|---|---|---|
| 0 | 0 | - (0) |
| 0 | 1 | 0, 1, 6 |
| 0 | 2 | 0, 1, 2, 6 |
| 0 | 3 | 0, 3, 6 |
| 0 | 4 | 0, 1, 3, 4, 6 |
| 0 | 5 | 0, 1, 2, 3, 4, 5, 6 |
| 0 | 6 | 0, 6 |
| 1 | 1 | - (1) |
| 1 | 2 | 1, 2 |
| 1 | 4 | 1, 4 |
| 1 | 5 | 1, 2, 4, 5 |
| 2 | 2 | - (2) |
| 2 | 5 | 2, 5 |
| 3 | 3 | - (3) |
| 3 | 4 | 3, 4 |
| 3 | 5 | 3, 4, 5 |
| 4 | 4 | - (4) |
| 4 | 5 | 4, 5 |
| 5 | 5 | - (5) |
| 6 | 6 | - (6) |
| 6 | 1 | 1, 6 |
| 6 | 2 | 1, 2, 6 |
| 6 | 3 | 3, 6 |
| 6 | 4 | 1, 3, 4, 6 |
| 6 | 5 | 1, 2, 3, 4, 5, 6 |

FIG. 18

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 19

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

FIG. 20

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 21

| UPLINK-DOWNLINK CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 22

| CQI INDEX | MODULATION | CODING RATE x 1024 | EFFICIENCY |
|---|---|---|---|
| 0 | OUT OF RANGE (out of range) | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

FIG. 25

| VALUE OF CSI REQUEST FIELD | DESCRIPTION |
|---|---|
| '00' | APERIODIC CSI REPORT IS NOT TRIGGERED |
| '01' | APERIODIC CSI REPORT OF FIRST SUBFRAME SET OF SERVING CELL c IS TRIGGERED |
| '10' | APERIODIC CSI REPORT OF SECOND SUBFRAME SET OF SERVING CELL c IS TRIGGERED |
| '11' | APERIODIC CSI REPORT OF FIRST AND SECOND SUBFRAME SETS OF SERVING CELL c IS TRIGGERED |

FIG. 26

| SUBFRAME SET #0 | SUBFRAME SET #1 | VALUE OF CSI REQUEST FIELD |
|---|---|---|
| CSI REPORT IS PERFORMED | CSI REPORT IS NOT PERFORMED | 01 |
| CSI REPORT IS NOT PERFORMED | CSI REPORT IS PERFORMED | 10 |
| CSI REPORT IS PERFORMED | CSI REPORT IS PERFORMED | 11 |

FIG. 27

| VALUE OF CSI REQUEST FIELD | DESCRIPTION |
|---|---|
| '00' | APERIODIC CSI REPORT IS NOT TRIGGERED |
| '01' | APERIODIC CSI REPORT OF FIRST SET OF SUBFRAME SET SET IN BY HIGHER LAYER IS TRIGGERED |
| '10' | APERIODIC CSI REPORT OF SECOND SET OF SUBFRAME SET SET IN BY HIGHER LAYER IS TRIGGERED |
| '11' | APERIODIC CSI REPORT OF THIRD SET OF SUBFRAME SET SET IN HIGHER LAYER IS TRIGGERED |

FIG. 28

| CSI PROCESS ID | SUBFRAME SET #0 | SUBFRAME SET #1 | VALUE OF CSI REQUEST FIELD |
|---|---|---|---|
| 1 | CSI REPORT IS TRIGGERED | | '01' |
| 1 | | CSI REPORT IS TRIGGERED | |
| 1 | CSI REPORT IS TRIGGERED | CSI REPORT IS TRIGGERED | '10' |
| 2 | CSI REPORT IS TRIGGERED | | |
| 2 | | CSI REPORT IS TRIGGERED | |
| 2 | CSI REPORT IS TRIGGERED | CSI REPORT IS TRIGGERED | '11' |

FIG. 29

| VALUE OF CSI REQUEST FIELD | DESCRIPTION |
|---|---|
| '00' | APERIODIC CSI REPORT IS NOT TRIGGERED |
| '01' | APERIODIC CSI REPORT OF FIRST SET OF SUBFRAME SET OF FIRST CSI PROCESS CONFIGURED BY HIGHER LAYER OF SERVING CELL c IS TRIGGERED |
| '10' | APERIODIC CSI REPORT OF SECOND SET OF SUBFRAME SET OF SECOND CSI PROCESS CONFIGURED BY HIGHER LAYER IS TRIGGERED |
| '11' | APERIODIC CSI REPORT OF THIRD SET OF SUBFRAME SET OF THIRD CSI PROCESS CONFIGURED BY HIGHER LAYER IS TRIGGERED |

FIG. 30

| CSI PROCESS ID#1 | | CSI PROCESS ID#2 | | VALUE OF CSI REQUEST FIELD |
|---|---|---|---|---|
| SUBFRAME SET #0-1 | SUBFRAME SET #1-1 | SUBFRAME SET #0-2 | SUBFRAME SET #1-2 | |
| CSI REPORT IS TRIGGERED | | | | |
| | CSI REPORT IS TRIGGERED | | | |
| CSI REPORT IS TRIGGERED | CSI REPORT IS TRIGGERED | | | '11' |
| | | CSI REPORT IS TRIGGERED | | |
| CSI REPORT IS TRIGGERED | | CSI REPORT IS TRIGGERED | | |
| | CSI REPORT IS TRIGGERED | CSI REPORT IS TRIGGERED | | |
| CSI REPORT IS TRIGGERED | CSI REPORT IS TRIGGERED | CSI REPORT IS TRIGGERED | | |
| | | | CSI REPORT IS TRIGGERED | |
| CSI REPORT IS TRIGGERED | | | CSI REPORT IS TRIGGERED | |
| | CSI REPORT IS TRIGGERED | | CSI REPORT IS TRIGGERED | '10' |
| CSI REPORT IS TRIGGERED | CSI REPORT IS TRIGGERED | | CSI REPORT IS TRIGGERED | |
| | | CSI REPORT IS TRIGGERED | CSI REPORT IS TRIGGERED | |
| CSI REPORT IS TRIGGERED | | CSI REPORT IS TRIGGERED | CSI REPORT IS TRIGGERED | |
| | CSI REPORT IS TRIGGERED | CSI REPORT IS TRIGGERED | CSI REPORT IS TRIGGERED | |
| CSI REPORT IS TRIGGERED | CSI REPORT IS TRIGGERED | CSI REPORT IS TRIGGERED | CSI REPORT IS TRIGGERED | '01' |

FIG. 31

| CSI PROCESS ID#1 FOR PRIMARY CELL | | CSI PROCESS ID#1 FOR SECONDARY CELL | | VALUE OF CSI REQUEST FIELD |
|---|---|---|---|---|
| SUBFRAME SET #0-1 | SUBFRAME SET #1-1 | SUBFRAME SET #0-2 | SUBFRAME SET #1-2 | |
| CSI REPORT IS TRIGGERED | | | | |
| | CSI REPORT IS TRIGGERED | | | |
| CSI REPORT IS TRIGGERED | CSI REPORT IS TRIGGERED | | | '01' |
| | | CSI REPORT IS TRIGGERED | | |
| CSI REPORT IS TRIGGERED | | CSI REPORT IS TRIGGERED | | |
| | CSI REPORT IS TRIGGERED | CSI REPORT IS TRIGGERED | | |
| CSI REPORT IS TRIGGERED | CSI REPORT IS TRIGGERED | CSI REPORT IS TRIGGERED | | |
| | | | CSI REPORT IS TRIGGERED | |
| CSI REPORT IS TRIGGERED | | | CSI REPORT IS TRIGGERED | |
| | CSI REPORT IS TRIGGERED | | CSI REPORT IS TRIGGERED | '10' |
| CSI REPORT IS TRIGGERED | CSI REPORT IS TRIGGERED | | CSI REPORT IS TRIGGERED | |
| | | CSI REPORT IS TRIGGERED | CSI REPORT IS TRIGGERED | '01' |
| CSI REPORT IS TRIGGERED | | CSI REPORT IS TRIGGERED | CSI REPORT IS TRIGGERED | |
| | CSI REPORT IS TRIGGERED | CSI REPORT IS TRIGGERED | CSI REPORT IS TRIGGERED | |
| CSI REPORT IS TRIGGERED | CSI REPORT IS TRIGGERED | CSI REPORT IS TRIGGERED | CSI REPORT IS TRIGGERED | '11' |

FIG. 32

| VALUE OF CSI REQUEST FIELD | DESCRIPTION |
|---|---|
| '00' | APERIODIC CSI REPORT IS NOT TRIGGERED |
| '01' | APERIODIC CSI REPORT OF ALL COMBINATIONS OF SUBFRAME SET AND CSI PROCESS CONFIGURED BY HIGHER LAYER OF SERVING CELL c IS TRIGGERED |
| '10' | APERIODIC CSI REPORT OF FIRST SET OF ALL COMBINATIONS OF SUBFRAME SET AND CSI PROCESS CONFIGURED BY HIGHER LAYER IS TRIGGERED |
| '11' | APERIODIC CSI REPORT OF SECOND SET OF COMBINATION OF SUBFRAME SET AND CSI PROCESS CONFIGURED BY HIGHER LAYER IS TRIGGERED |

FIG. 33

| CSI PROCESS ID#1 SUBFRAME SET #1 | CSI PROCESS ID#2 SUBFRAME SET #2 | CSI PROCESS ID#3 SUBFRAME SET #3 | CSI PROCESS ID#4 SUBFRAME SET #4 | VALUE OF CSI REQUEST FIELD |
|---|---|---|---|---|
| CSI REPORT IS TRIGGERED | | | | |
| | CSI REPORT IS TRIGGERED | | | |
| CSI REPORT IS TRIGGERED | CSI REPORT IS TRIGGERED | | | '11' |
| | | CSI REPORT IS TRIGGERED | | |
| CSI REPORT IS TRIGGERED | | CSI REPORT IS TRIGGERED | | |
| | CSI REPORT IS TRIGGERED | CSI REPORT IS TRIGGERED | | |
| CSI REPORT IS TRIGGERED | CSI REPORT IS TRIGGERED | CSI REPORT IS TRIGGERED | | |
| | | | CSI REPORT IS TRIGGERED | |
| CSI REPORT IS TRIGGERED | | | CSI REPORT IS TRIGGERED | |
| | CSI REPORT IS TRIGGERED | | CSI REPORT IS TRIGGERED | '10' |
| CSI REPORT IS TRIGGERED | CSI REPORT IS TRIGGERED | | CSI REPORT IS TRIGGERED | |
| | | CSI REPORT IS TRIGGERED | CSI REPORT IS TRIGGERED | |
| CSI REPORT IS TRIGGERED | | CSI REPORT IS TRIGGERED | CSI REPORT IS TRIGGERED | |
| | CSI REPORT IS TRIGGERED | CSI REPORT IS TRIGGERED | CSI REPORT IS TRIGGERED | |
| CSI REPORT IS TRIGGERED | CSI REPORT IS TRIGGERED | CSI REPORT IS TRIGGERED | CSI REPORT IS TRIGGERED | '01' |

US 9,860,880 B2

TERMINAL DEVICE, BASE STATION DEVICE, INTEGRATED CIRCUIT AND COMMUNICATION METHOD

TECHNICAL FIELD

The present invention relates to a terminal device, a base station device, an integrated circuit and a communication method.

The present application claims priority to Japanese Patent Application No. 2013-141554 filed in the Japanese Patent Office on Jul. 5, 2013, the disclosure of which is herein incorporated by reference in its entirety.

BACKGROUND ART

A cellular mobile communication wireless access system and a wireless network (hereinafter, referred to as "Long Term Evolution (LTE)" or "Evolved Universal Terrestrial Radio Access (EUTRA)") have been examined in the 3rd Generation Partnership Project (3GPP). In the LTE system, a base station device is also referred to as evolved NodeB (eNodeB) and a terminal device is also referred to as user equipment (UE). The LTE system is a cellular communication system in which a plurality of coverage areas of the base station device are arranged in a cell shape. A single base station device may manage a plurality of cells.

The LTE system corresponds to a time division duplex (TDD) system. The LTE system using the TDD system is also referred to as a TD-LTE system or an LTE TDD system. The TDD system is a technique that performs time division multiplexing on an uplink signal and a downlink signal in order to perform full duplex communication in a single frequency band.

In the 3GPP, application of interference management and traffic adaptation (IMTA) to the TD-LTE system has been examined. Traffic adaptation is a technique that changes the ratio of uplink resources to downlink resources depending on uplink traffic and downlink traffic.

NPL 1 discloses a method of using a flexible subframe as a method for achieving traffic adaptation. The base station device can receive uplink signals or transmit downlink signals in the flexible subframe. In NPL 1, the terminal device regards the flexible subframe as a downlink subframe as long as the base station device does not instruct the terminal device to transmit the uplink signals in the flexible subframe. The traffic adaptation technique is also referred to as dynamic TDD.

NPL 1 discloses a technique that determines hybrid automatic repeat request (HARQ) timing for a physical downlink shared channel (PDSCH) on the basis of the uplink-downlink configuration to be newly introduced and determines the HARQ timing for a physical uplink shared channel (PUSCH) on the basis of the initial UL-DL configuration.

NPL 2 discloses the following techniques: (a) a UL/DL reference configuration which is introduced; and (b) some subframes which are scheduled for uplink or downlink by a dynamic grant/assignment from a scheduler.

A procedure of the terminal device for reporting channel state information (CSI) is described in section 7.2 of NPL 3. The base station device allocates downlink resources to the terminal device on the basis of the channel state information reported from a plurality of terminal devices. The channel state information includes a channel quality indicator (CQI).

CITATION LIST

Non-Patent Literature

NPL 1: "On standardization impact of TDD UL-DL adaptation", R1-122016, Ericsson, ST-Ericsson, 3GPP TSG-RAN WG1 Meeting #69, Prague, Czech Republic, 21-25 May 2012.

NPL 2: "Signaling support for dynamic TDD", R1-130558, Ericsson, ST-Ericsson, 3GPP TSG-RAN WG1 Meeting #72, St Julian's, Malta, 28 Jan.-1 Feb. 2013.

NPL 3: "3GPP TS36.213 v11.2.0 (2013-02)", February, 2013.

SUMMARY OF INVENTION

Technical Problem

However, a technique related to the channel state information has not been examined in the wireless communication system.

The invention has been made in view of the foregoing circumstances, and it is an object of the invention to provide a terminal device, a base station device, an integrated circuit and a wireless communication method that can efficiently perform communication in a wireless communication system that uses channel state information.

Solution to Problem (1) In order to achieve the aforementioned object, the present invention provides the following means. A terminal device according to a first aspect of the present invention is a terminal device that communicates with a base station device. The terminal device includes a reception unit that receives downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value in a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(2) A terminal device according to a second aspect of the present invention further includes a reception unit that receives the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(3) A terminal device according to a third aspect of the present invention further includes a transmission unit that reports the channel state information for a pair of one CSI process or each of a plurality of CSI processes and the subframe set indicated using the third information by using the physical uplink shared channel in a case that the report of the channel state information is triggered by the first value in the field of the first information, reports the channel state information for a pair of one CSI process or each of a plurality of CSI processes and the subframe set indicated using the third information by using the physical uplink shared channel in a case that the report of the channel state information is triggered by the second value in the field of the first information, and reports the channel state information for a pair of one CSI process or each of a plurality of CSI processes and the subframe set indicated using the third information by using the physical uplink shared channel in a case that the report of the channel state information is triggered by the third value in the field of the first information.

(4) A terminal device according to a fourth aspect of the present invention further includes a transmission unit that reports the channel state information for a pair of the one CSI process or each of the plurality of CSI processes and the subframe set indicated using the third information by using the physical uplink shared channel in a case that the report of the channel state information is triggered by the first value in the field of the first information, reports the channel state information for a pair of the one CSI process or each of the plurality of CSI processes and the subframe set indicated using the third information by using the physical uplink shared channel in a case that the report of the channel state information is triggered by the second value in the field of the first information, and reports the channel state information for a pair of the one CSI process or each of the plurality of CSI processes and the subframe set indicated using the third information by using the physical uplink shared channel in a case that the report of the channel state information is triggered by the third value in the field of the first information.

(5) A base station device according to a fifth aspect of the present invention is a base station device that communicates with a terminal device. The base station device includes a transmission unit that transmits downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(6) A base station device according to a sixth aspect of the present invention further includes a transmission unit that transmits the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(7) In a base station device according to a seventh aspect of the present invention, the report of the channel state information for a pair of one CSI process or each of a plurality of CSI processes and the subframe set indicated using the third information by using the physical uplink shared channel is triggered by the first value in the field of the first information, the report of the channel state information for a pair of one CSI process or each of a plurality of CSI processes and the subframe set indicated using the third information by using the physical uplink shared channel is triggered by the second value in the field of the first information, and the report of the channel state information for a pair of one CSI process or each of a plurality of CSI processes and the subframe set indicated using the third information by using the physical uplink shared channel is triggered by the third value in the field of the first information.

(8) In a base station device according to an eighth aspect of the present invention, the report of the channel state information for a pair of the one CSI process or each of the plurality of CSI processes and the subframe set indicated using the third information by using the physical uplink shared channel is triggered by the first value in the field of the first information, the report of the channel state information for a pair of the one CSI process or each of the plurality of CSI processes and the subframe set indicated using the third information by using the physical uplink shared channel is triggered by the second value in the field of the first information, and the report of the channel state information for a pair of the one CSI process or each of the plurality of CSI processes and the subframe set indicated using the third information by using the physical uplink shared channel is triggered by the third value in the field of the first information.

(9) An integrated circuit according to a ninth aspect of the present invention causes the terminal device to exhibit a function of receiving downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(10) An integrated circuit according to a tenth aspect of the present invention causes the terminal device to exhibit a function of receiving the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(11) An integrated circuit according to an eleventh aspect of the present invention causes the terminal device to exhibit a function of reporting the channel state information for a pair of one CSI process or each of a plurality of CSI processes and the subframe set indicated using the third information by using the physical uplink shared channel in a case that the report of the channel state information is triggered by the first value in the field of the first information, reporting the channel state information for a pair of one CSI process or each of a plurality of CSI processes and the subframe set indicated using the third information by using the physical uplink shared channel in a case that the report of the channel state information is triggered by the second value in the field of the first information, and reporting the channel state information for a pair of one CSI process or each of a plurality of CSI processes and the subframe set indicated using the third information by using the physical uplink shared channel in a case that the report of the channel state information is triggered by the third value in the field of the first information.

(12) An integrated circuit according to a twelfth aspect of the present invention causes the terminal device to exhibit a function of reporting the channel state information for a pair of the one CSI process or each of the plurality of CSI processes and the subframe set indicated using the third information by using the physical uplink shared channel in a case that the report of the channel state information is triggered by the first value in the field of the first information, reporting the channel state information for a pair of one CSI process or each of a plurality of CSI processes and the subframe set indicated using the third information by using the physical uplink shared channel in a case that the report of the channel state information is triggered by the second value in the field of the first information, and reporting the channel state information for a pair of one CSI process or each of a plurality of CSI processes and the subframe set indicated using the third information by using the physical uplink shared channel in a case that the report of the channel state information is triggered by the third value in the field of the first information.

(13) An integrated circuit according to a thirteenth aspect of the present invention is an integrated circuit that is mounted in a base station communicating with a terminal device. The integrated circuit causes the base station device to exhibit a function of transmitting downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(14) An integrated circuit according to a fourteenth aspect of the present invention causes the base station device to exhibit a function of transmitting the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(15) In an integrated circuit according to a fifteenth aspect of the present invention, the report of the channel state information for a pair of one CSI process or each of a plurality of CSI processes and the subframe set indicated using the third information by using the physical uplink shared channel is triggered by the first value in the field of the first information, the report of the channel state information for a pair of one CSI process or each of a plurality of CSI processes and the subframe set indicated using the third information by using the physical uplink shared channel is triggered by the second value in the field of the first information, and the report of the channel state information for a pair of one CSI process or each of a plurality of CSI processes and the subframe set indicated using the third information by using the physical uplink shared channel is triggered by the third value in the field of the first information.

(16) In an integrated circuit according to a sixteenth aspect of the present invention, the report of the channel state information for a pair of the one CSI process or each of the plurality of CSI processes and the subframe set indicated using the third information by using the physical uplink shared channel is triggered by the first value in the field of the first information, the report of the channel state information for a pair of the one CSI process or each of the plurality of CSI processes and the subframe set indicated using the third information by using the physical uplink shared channel is triggered by the second value in the field of the first information, and the report of the channel state information for a pair of the one CSI process or each of the plurality of CSI processes and the subframe set indicated using the third information by using the physical uplink shared channel is triggered by the third value in the field of the first information.

(17) A communication method according to a seventeenth aspect of the present invention is a communication method used in a terminal device communicating with a base station device. The method includes causing receiving means to receive downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(18) A communication method according to an eighteenth aspect of the present invention further includes causing receiving means to receive the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(19) A communication method according to a nineteenth aspect of the present invention further includes causing transmitting means to report the channel state information for a pair of one CSI process or each of a plurality of CSI processes and the subframe set indicated using the third information by using the physical uplink shared channel in a case that the report of the channel state information is triggered by the first value in the field of the first information, report the channel state information for a pair of one CSI process or each of a plurality of CSI processes and the subframe set indicated using the third information by using the physical uplink shared channel in a case that the report of the channel state information is triggered by the second value in the field of the first information, and report the channel state information for a pair of one CSI process or each of a plurality of CSI processes and the subframe set indicated using the third information by using the physical uplink shared channel in a case that the report of the channel state information is triggered by the third value in the field of the first information.

(20) A communication method according to a twentieth aspect of the present invention further includes causing transmitting means to report the channel state information for a pair of the one CSI process or each of the plurality of CSI processes and the subframe set indicated using the third information by using the physical uplink shared channel in a case that the report of the channel state information is triggered by the first value in the field of the first information, report the channel state information for a pair of the one CSI process or each of the plurality of CSI processes and the subframe set indicated using the third information by using the physical uplink shared channel in a case that the report of the channel state information is triggered by the second value in the field of the first information, and report the channel state information for a pair of the one CSI process or each of the plurality of CSI processes and the subframe set indicated using the third information by using the physical uplink shared channel in a case that the report of the channel state information is triggered by the third value in the field of the first information.

(21) A communication method according to a twenty first aspect of the present invention is a communication method used in a base station device communicating with a terminal device. The method includes causing transmitting means to transmit downlink control information which is used for scheduling of a physical uplink shared channel and includes first information used to trigger a report of channel state information using the physical uplink shared channel, a higher layer signal including second information used to indicate two subframe sets, and the higher layer signal including third information. The third information is used to indicate a subframe set of the two subframe sets for which the report of the channel state information is triggered in a case that the report of the channel state information is triggered by a first value of a field of the first information, the third information is used to indicate a subframe set of the two subframe sets for which the report of the channel state information is triggered in a case that the report of the channel state information is triggered by a second value in the field of the first information, and the third information is used to indicate a subframe set of the two subframe sets for which the report of the channel state information is triggered in a case that the report of the channel state information is triggered by a third value in the field of the first information.

(22) A communication method according to a twenty second aspect of the present invention further includes causing transmitting means to transmit the higher layer signal including fourth information. The fourth information is used to indicate a CSI process, which corresponds to the subframe set indicated using the third information and in which the report is triggered by the first value in the field of the first information, for one CSI process or each of a plurality of CSI processes, the fourth information is used to indicate a CSI process, which corresponds to the subframe set indicated using the third information and in which the report is triggered by the second value in the field of the first information, and the fourth information is used to indicate a CSI process, which corresponds to the subframe set indicated using the third information and in which the report is triggered by the third value in the field of the first information.

(23) In a communication method according to a twenty third aspect of the present invention, the report of the channel state information for a pair of one CSI process or each of a plurality of CSI processes and the subframe set indicated using the third information by using the physical uplink shared channel is triggered by the first value in the field of the first information, the report of the channel state information for a pair of one CSI process or each of a plurality of CSI processes and the subframe set indicated using the third information by using the physical uplink shared channel is triggered by the second value in the field of the first information, and the report of the channel state information for a pair of one CSI process or each of a plurality of CSI processes and the subframe set indicated using the third information by using the physical uplink shared channel is triggered by the third value in the field of the first information.

(24) In a communication method according to a twenty fourth aspect of the present invention, the report of the channel state information for a pair of the one CSI process or each of the plurality of CSI processes and the subframe set indicated using the third information by using the physical uplink shared channel is triggered by the first value in the field of the first information, the report of the channel state information for a pair of the one CSI process or each of the plurality of CSI processes and the subframe set indicated using the third information by using the physical uplink shared channel is triggered by the second value in the field of the first information, and the report of the channel state information for a pair of the one CSI process or each of the plurality of CSI processes and the subframe set indicated using the third information by using the physical uplink shared channel is triggered by the third value in the field of the first information.

Advantageous Effects of Invention

According to an aspect of the present invention, it is possible to allow a terminal device and a base station device to efficiently perform communication in a wireless communication system that uses channel state information.

BRIEF DESCRIPTION OF DRAWINGS

FIG. 9 is a table illustrating an example of an uplink-downlink configuration in this embodiment.

FIG. 12 is a diagram illustrating a correspondence between a pair which is formed by a first uplink reference UL-DL configuration for another serving cell (primary cell) and a first uplink reference UL-DL configuration for a serving cell (secondary cell) and a second uplink reference UL-DL configuration for the secondary cell in this embodiment.

FIG. 14 is a diagram illustrating a correspondence between a pair which is formed by a first downlink reference UL-DL configuration for the primary cell and a first downlink reference UL-DL configuration for the secondary cell and a second downlink reference UL-DL configuration for the secondary cell in this embodiment.

FIG. 16 is a diagram illustrating the relationship between the subframe which is indicated by the first uplink reference UL-DL configuration, the subframe which is indicated by the first downlink reference UL-DL configuration, and a subframe which is indicated by a transmission direction UL-DL configuration in this embodiment.

FIG. 17 is a diagram illustrating the relationship between the first uplink reference UL-DL configuration, the first downlink reference UL-DL configuration, and the transmission direction UL-DL configuration in this embodiment.

FIG. 18 is a diagram illustrating a correspondence between a subframe n in which a PDCCH/EPDCCH/PHICH is arranged and a subframe n+k in which a PUSCH corresponding to the PDCCH/EPDCCH/PHICH is arranged in this embodiment.

FIG. 19 is a diagram illustrating a correspondence between a subframe n in which a PHICH is arranged and a subframe n−k in which a PUSCH corresponding to the PHICH is arranged in this embodiment.

FIG. 20 is a diagram illustrating a correspondence between a subframe n in which a PUSCH is arranged and a subframe n+k in which a PHICH corresponding to the PUSCH is arranged in this embodiment. The terminal device 1 specifies (selects or determines) the value of k according to the table shown in FIG. 20.

FIG. 21 is a diagram illustrating a correspondence between a subframe n−k in which a PDSCH is arranged and a subframe n in which a HARQ-ACK corresponding to the PDSCH is transmitted in this embodiment.

FIG. 22 is a table showing a coding rate and a modulation method corresponding to a CQI index in this embodiment.

FIG. 25 shows an example of a value of a CSI request field in this embodiment.

FIG. 26 illustrates an example of a subframe set for a CSI report and the value of the CSI request field in this embodiment.

FIG. 27 shows an example of the value of the CSI request field in this embodiment.

FIG. 28 shows an example of the CSI process/subframe set for the CSI report and the value of the CSI request field in this embodiment.

FIG. 29 shows an example of the value of the CSI request field in this embodiment.

FIG. 30 shows an example of the CSI process/subframe set for the CSI report and the value of the CSI request field in this embodiment.

FIG. 31 shows an example of the CSI process/subframe set for the CSI report and the value of the CSI request field in this embodiment.

FIG. 32 shows an example of the value of the CSI request field in this embodiment.

FIG. 33 shows an example of the CSI process/subframe set for the CSI report and the value of the CSI request field in this embodiment.

DESCRIPTION OF EMBODIMENTS

Figure 1:
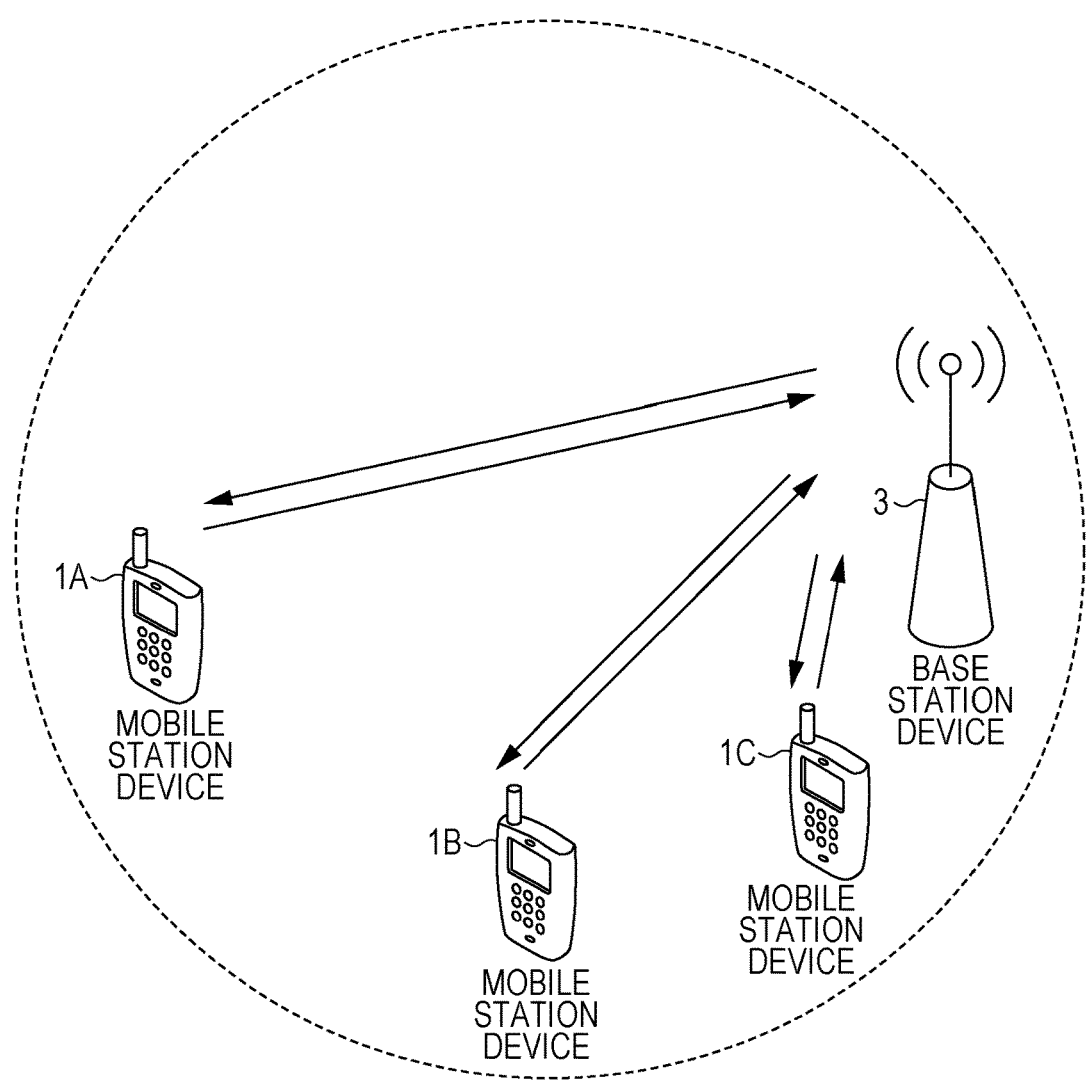
FIG. 1 is a conceptual diagram illustrating a wireless communication system according to this embodiment.

Hereinafter, an embodiment of the invention will be described.

In this embodiment, a plurality of cells are set to a terminal device. A technology in which the terminal device performs communication through the plurality of cells is referred to as cell aggregation or carrier aggregation. The present invention may be applied to each of the plurality of cells set to the terminal device. The present invention may be applied to some of the plurality of set cells. The cell set to the terminal device is also referred to as a serving cell.

The plurality of set cells include one primary cell and one secondary cell or a plurality of secondary cells. The primary cell is a serving cell in which an initial connection establishment procedure is performed, a serving cell in which a connection re-establishment procedure is started, or a cell which is indicated as the primary cell in a handover procedure. The secondary cell may be set in a case that RRC connection is established or after the RRC connection is established.

A time division duplex (TDD) system is applied to a wireless communication system of this embodiment. In cell aggregation, the TDD system may be applied to all of the plurality of cells. In the cell aggregation, cells to which the TDD system is applied and cells to which a frequency division duplex (FDD) system is applied may be aggregated. In a case that the cells to which the TDD system is applied and the cells to which the FDD system is applied are aggregated, the present invention may be applied to the cells to which the TDD system is applied.

In a case that the plurality of cells to which the TDD system is applied are aggregated, a half-duplex TDD system or a full-duplex TDD system is applied.

In the half-duplex TDD system, in the plurality of cells to which the TDD system is applied, it is difficult to simultaneously perform uplink transmission and downlink reception. In the half-duplex TDD system, the terminal device does not simultaneously perform transmission and reception in one primary cell in a certain band, or one primary cell and one secondary cell or a plurality of secondary cells in a plurality of different bands.

In the full-duplex TDD system, in the plurality of cells to which the TDD system is applied, it is possible to simultaneously perform the uplink transmission and the downlink reception. In the full-duplex TDD system, the terminal device can simultaneously perform transmission and reception in the plurality of serving cells in the plurality of different bands.

The terminal device transmits information indicating combinations of bands in which the carrier aggregation is supported by the terminal device to the base station device. The terminal device transmits information indicating whether or not simultaneous transmission and reception are supported for each of the combinations of the bands in the plurality of serving cells in the plurality of different bands to the base station device.

In this embodiment, "X/Y" includes the meaning of "X or Y". In this embodiment, "X/Y" includes the meaning of "X and Y". In this embodiment, "X/Y" includes the meaning of "X and/or Y".

FIG. 1 is a conceptual diagram illustrating a wireless communication system according to this embodiment. In FIG. 1, the wireless communication system includes terminal devices 1A to 1C and a base station device 3. Hereinafter, the terminal devices 1A to 1C are referred to as terminal devices 1.

Physical channels and physical signals of this embodiment will be described.

In FIG. 1, in uplink wireless communication from the terminal device 1 to the base station device 3, the following uplink physical channels are used. The uplink physical channels are used to transmit information output from a higher layer.

Physical uplink control channel (PUCCH)
Physical uplink shared channel (PUSCH)
Physical random access channel (PRACH)

The PUCCH is a physical channel used to transmit uplink control information (UCI). The uplink control information includes channel state information (CSI) of a downlink, a scheduling request (SR) indicating a request for a PUSCH resource, and acknowledgement (ACK) and negative ACK (NACK) in response to downlink data (TB: transport block, DL-SCH: Downlink-Shared channel). The ACK/NACK is referred to as HARQ-ACK, HARQ feedback, or response information.

The PUSCH is a physical channel used to transmit uplink data (UL-SCH: Uplink-Shared Channel). The PUSCH may be used to transmit the HARQ-ACK and/or the channel state information together with the uplink data. The PUSCH may be used to transmit only the channel state information or only the HARQ-ACK and the channel state information.

The PRACH is a physical channel used to transmit a random access preamble. The PRACH primarily serves to allow the terminal device 1 to be synchronized with the base station device 3 in the time domain. In addition, the PRACH is used to indicate an initial connection establishment procedure, a handover procedure, a connection re-establishment procedure, synchronization of uplink transmission (timing adjustment), and a request for a PUSCH resource.

In FIG. 1, in the uplink wireless communication, the following uplink physical signals are used. The uplink physical signal is not used to transmit information output from the higher layer, but is used by a physical layer.

Uplink reference signal (UL RS)

In this embodiment, the following two types of uplink reference signals are used.

Demodulation reference signal (DMRS)
Sounding reference signal (SRS)

The DMRS relates to the transmission of the PUSCH or the PUCCH. The DMRS is time-multiplexed with the PUSCH or the PUCCH. The base station device 3 uses the DMRS in order to correct the channel of the PUSCH or the PUCCH. Hereinafter, the simultaneous transmission of the PUSCH and the DMRS is simply referred to as the transmission of the PUSCH. Hereinafter, the simultaneous transmission of the PUCCH and the DMRS is simply referred to as the transmission of the PUCCH.

The SRS does not relate to the transmission of the PUSCH or the PUCCH. The base station device 3 uses the SRS in order to measure a channel state of the uplink. The terminal device 1 transmits a first SRS in a first resource set by the higher layer. In a case of receiving information indicating a request for the transmission of the SRS through the PUCCH, the terminal device 1 transmits a second SRS in a second resource set by the higher layer by only once. The first SRS is referred to as a periodic SRS or a type-0-triggered SRS. The second SRS is referred to as an aperiodic SRS or a type-1-triggered SRS. The transmission of the aperiodic SRS is scheduled with information indicating the request for the transmission of the SRS.

In FIG. 1, in the downlink wireless communication from the base station device 3 to the terminal device 1, the following downlink physical channels are used. The downlink physical channels are used to transmit information output from the higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB, broadcast channel (BCH)) which is shared by the terminal devices 1. The MIB is transmitted at an interval of 40 ms. The MIB is repeatedly transmitted with a period of 10 ms. Specifically, the MIB is initially transmitted in a subframe 0 of a radio frame which satisfies SFN mod 4=0. The MIB is repeated in a subframe 0 of all of other radio frames. A system frame number (SFN) is a radio frame number. The MIB is system information. For example, the MIB includes information indicating the SFN.

The PCFICH is used to transmit information for designating a region (the number of OFDM symbols) which is used to transmit the PDCCH.

The PHICH is used to transmit a HARQ indicator (HARQ feedback or response information) which indicates acknowledgement (ACK) or negative acknowledgement (NACK) of the UL-SCH received by the base station device 3. For example, in a case of receiving the HARQ indicator indicating the ACK, the terminal device 1 does not re-transmit corresponding uplink data. For example, in a case of receiving the HARQ indicator indicating the NACK, the terminal device 1 re-transmits corresponding uplink data. A single PHICH transmits the HARQ indicator for a single uplink data item. The base station device 3 transmits the HARQ indicators for a plurality of uplink data items which are included in the same PUSCH, using a plurality of PHICHs.

The PDSCH and The EPDCCH are used to transmit downlink control information (DCI). The downlink control information is referred to as a DCI format. The downlink control information includes a downlink grant and an uplink grant. The downlink grant is referred to as downlink assignment or downlink allocation.

The downlink grant is downlink control information which is used to schedule a single PDSCH in a single cell. The downlink grant is used to schedule the PDSCH in the same subframe as that in which the downlink grant is transmitted. The uplink grant is downlink control information which is used to schedule a single PUSCH in a single cell. The uplink grant is used to schedule a single PUSCH in a subframe that is four or more subframes after the subframe in which the uplink grant is transmitted.

A cyclic redundancy check (CRC) parity bit is added to the DCI format. The CRC parity bit is scrambled with a cell-radio network temporary identifier (C-RNTI) or a semi persistent scheduling cell-radio network temporary identifier (SPS C-RNTI). The C-RNTI and the SPS C-RNTI are identifiers for identifying the terminal device in the cell.

The C-RNTI is used to control the PDSCH or the PUSCH in a single subframe. The SPS C-RNTI is used to periodically allocate the PDSCH or PUSCH resources.

The PDSCH is used to transmit downlink data (downlink shared channel: DL-SCH).

The PMCH is used to transmit multicast data (MCH: multicast channel).

In FIG. 1, in the downlink wireless communication, the following downlink physical signals are used. The downlink physical signals are not used to transmit information output from the higher layer, but are used by the physical layer.

Synchronization signal (SS)
Downlink reference signal (DL RS)

The synchronization signals are used to allow the terminal device 1 to be synchronized in the frequency domain and the time domain of the downlink. In the TDD system, the synchronization signals are arranged in subframes 0, 1, 5 and 6 of the radio frame. In the FDD system, the synchronization signals are arranged in subframes 0 and 5 of the radio frame.

The downlink reference signal is used to correct the channel of the downlink physical channel by the terminal device 1. The downlink reference signal is used to calculate the channel state information of the downlink by the terminal device 1.

In this embodiment, the following five types of downlink reference signals are used.

Cell-specific reference signal (CRS)
UE-specific reference signal (URS) related to PDSCH
Demodulation reference signal (DMRS) related to EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in all bands of the subframe. The CRS is used to demodulate the PBCH/PDCCH/PHICH/PCFICH/and the PDSCH. The CRS may be used to calculate the channel state information of the downlink by the terminal device 1. The PBCH/PDCCH/PHICH/and the PCFICH are transmitted through an antenna port which is used to transmit the CRS.

The URS related to the PDSCH is transmitted in the subframe and band which are used to transmit the PDSCH related to the URS. The URS is used to demodulate the PDSCH to which the URS is related.

The PDSCH is transmitted through an antenna port which is used to transmit the CRS or the URS. A DCI format 1A is used to schedule the PDSCH that is transmitted through the antenna port used to transmit the CRS. A DCI format 2D is used to schedule the PDSCH that is transmitted through the antenna port used to transmit the URS.

The DMRS related to the EPDCCH is transmitted in the subframe and band that are used to transmit the EPDCCH to which the DMRS is related. The DMRS is used to demodulate the EPDCCH to which the DMRS is related. The EPDCCH is transmitted through an antenna port which is used to transmit the DMRS.

The NZP CSI-RS is transmitted in the set subframe. Resources in which the NZP CSI-RS is transmitted are set by the base station device. The NZP CSI-RS is used to calculate the channel state information of the downlink by the terminal device 1. The terminal device 1 performs signal measurement (channel measurement) using the NZP CSI-RS.

The resources of the ZP CSI-RS are set by the base station device 3. The base station device 3 transmits the ZP CSI-RS with zero output. That is, the base station device 3 does not transmit the ZP CSI-RS. The base station device 3 does not transmit the PDSCH and the EPDCCH in the set resources of the ZP CSI-RS. For example, the terminal device 1 can measure interference in resources corresponding to the NZP CSI-RS in a given cell.

The MBSFN RS is transmitted in all bands of the subframe used to transmit the PMCH. The MBSFN RS is used to demodulate the PMCH. The PMCH is transmitted through an antenna port that is used to transmit the MBSFN RS.

The PRS is used to measure a geographical location of the terminal device by the terminal device.

The downlink physical channel and the downlink physical signal are generically referred to as a downlink signal. The uplink physical channel and the uplink physical signal are generically referred to as an uplink signal. The downlink physical channel and the uplink physical channel are generically referred to as a physical channel. The downlink physical signal and the uplink physical signal are generically referred to as a physical signal.

The BCH, the MCH, the UL-SCH, and the DL-SCH are transport channels. The channel which is used in a medium access control (MAC) layer is referred to as a transport channel. The unit of the transport channel used in the MAC layer is also referred to as a transport block (TB) or a MAC protocol data unit (PDU). Hybrid automatic repeat request (HARQ) control is performed for each transport block in the MAC layer. The transport block is the unit of data which is transmitted (delivered) by the MAC layer to the physical layer. In the physical layer, the transport block is mapped to a code word and a coding process is performed for each code word.

Hereinafter, the structure of the radio frame according to this embodiment will be described.

Figure 2:
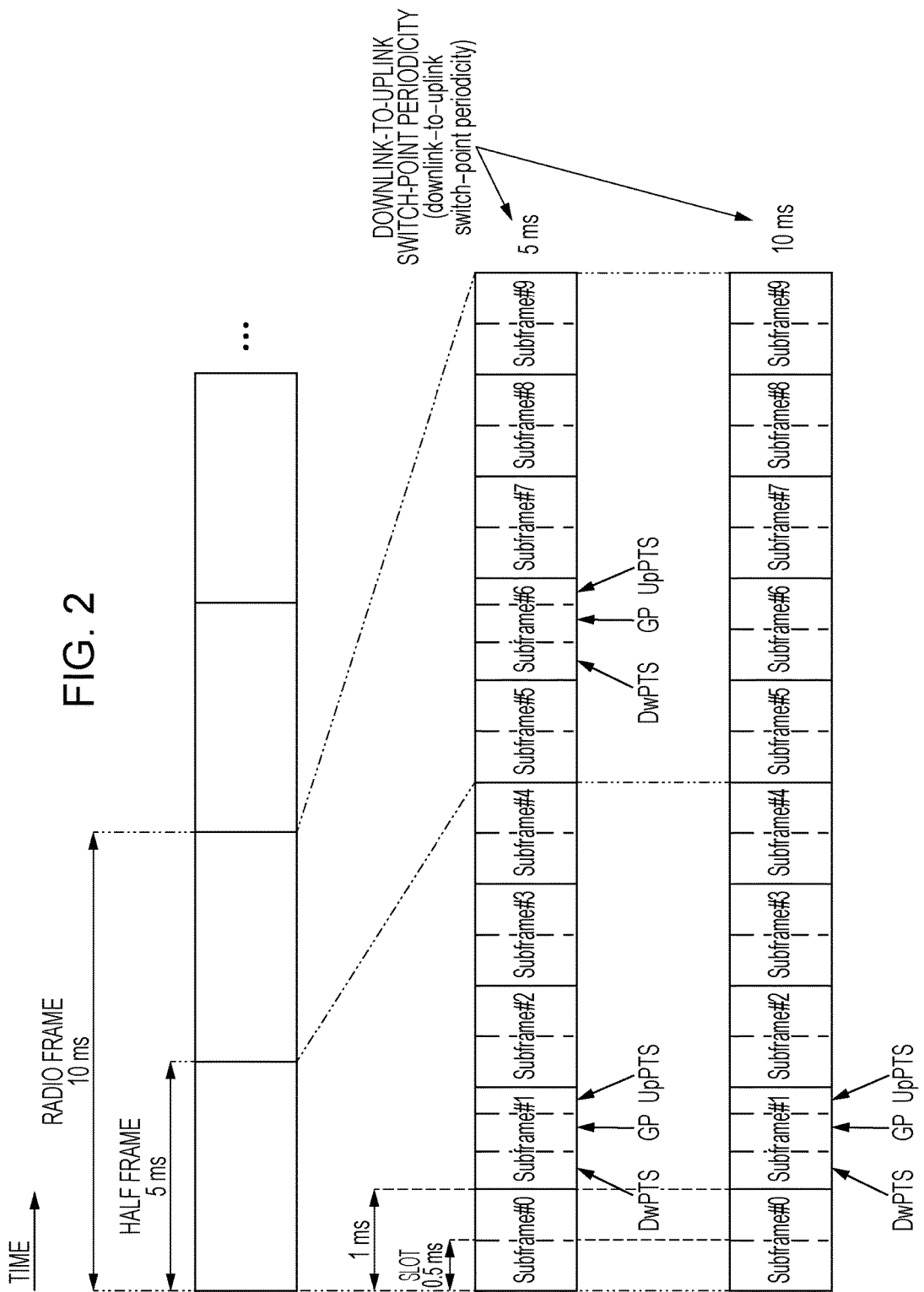
FIG. 2 is a diagram illustrating the schematic structure of a radio frame according to this embodiment.

FIG. 2 is a diagram illustrating a schematic structure of the radio frame according to this embodiment. Each radio frame has a length of 10 ms. In FIG. 2, a horizontal axis represents a time axis. Each radio frame includes two half frames. Each half frame has a length of 5 ms. Each half frame includes five subframes. Each subframe has a length of 1 ms, and is defined by two consecutive slots. Each slot has a length of 0.5 ms. An i-th subframe in the radio frame includes a (2×i)-th slot and a (2×i+1)-th slot. That is, ten subframes can be used at an interval of 10 ms.

In this embodiment, the following three types of subframes are defined:
Downlink subframe (first subframe)
Uplink subframe (second subframe)
Special subframe (third subframe)

The downlink subframe is a subframe reserved for downlink transmission. The uplink subframe is a subframe reserved for uplink transmission. The special subframe includes three fields. The three fields are a downlink pilot time slot (DwPTS), a guard period (GP), and an uplink pilot time slot (UpPTS). The total length of the DwPTS, the GP, and the UpPTS is 1 ms. The DwPTS is a field which is reserved for downlink transmission. The UpPTS is a field which is reversed for uplink transmission. The GP is a field in which downlink transmission and uplink transmission are not performed. The special subframe may include only the DwPTS and the GP or the special subframe may include only the GP and the UpPTS.

A single radio frame includes at least the downlink subframe, the uplink subframe, and the special subframe.

The wireless communication system according to this embodiment supports a downlink-uplink switch-point periodicity of 5 ms and 10 ms. In a case that the downlink-uplink switch-point periodicity is 5 ms, the special subframe is included in two half frames of the radio frame. In a case that the downlink-uplink switch-point periodicity is 10 ms, the special subframe is included only in the first half frame of the radio frame.

Next, the structure of the slot according to this embodiment will be described.

Figure 3:
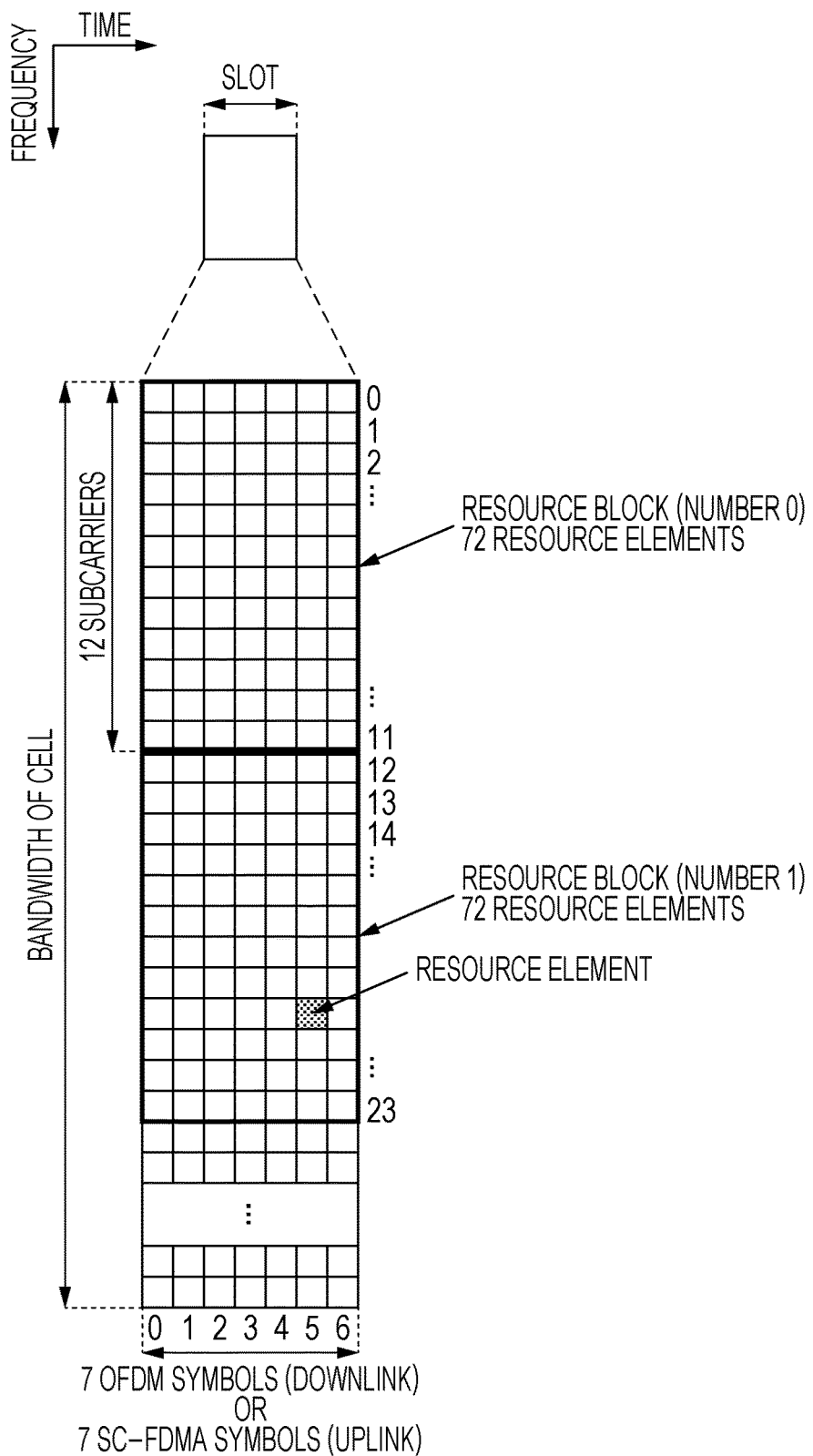
FIG. 3 is a diagram illustrating the structure of a slot according to this embodiment.

FIG. 3 is a diagram showing the structure of the slot according to this embodiment. In this embodiment, a normal cyclic prefix (CP) is applied to OFDM symbols. An extended cyclic prefix (CP) may be applied to the OFDM symbol. The physical signals or the physical channels transmitted in the respective slots are represented by the resource grids. In FIG. 3, a horizontal axis represents a time axis, and a vertical axis represents a frequency axis. In the downlink, a resource grid is defined by a plurality of subcarriers and a plurality of OFDM symbols. In the uplink, a resource grid is defined by a plurality of subcarriers and a plurality of SC-FDMA symbols. The number of subcarriers constituting one slot depends on a bandwidth of the cell. The number of OFDM symbols or SC-FDMA symbols constituting one slot is seven. Each element in the resource grid is referred to as a resource element. The resource element is identified using a subcarrier number and an OFDM symbol number or a SC-FDMA symbol number.

The resource block is used to represent the mapping of a given physical channel (for example, the PDSCH or the PUSCH) to the resource element. For the resource block, a virtual resource block and a physical resource block are defined. First, a given physical channel is mapped to the virtual resource block. Then, the virtual resource block is mapped to the physical resource block. One physical resource block is defined from 7 consecutive OFDM symbols or SC-FDMA symbols in the time domain and 12 consecutive fs in the frequency domain. Therefore, one physical resource block includes (7×12) resource elements. In addition, one physical resource block corresponds to one slot in the time domain and corresponds to 180 kHz in the frequency domain. The physical resource block is numbered from 0 in the frequency domain.

Next, the physical channel and the physical signal which are transmitted in each subframe will be described.

Figure 4:
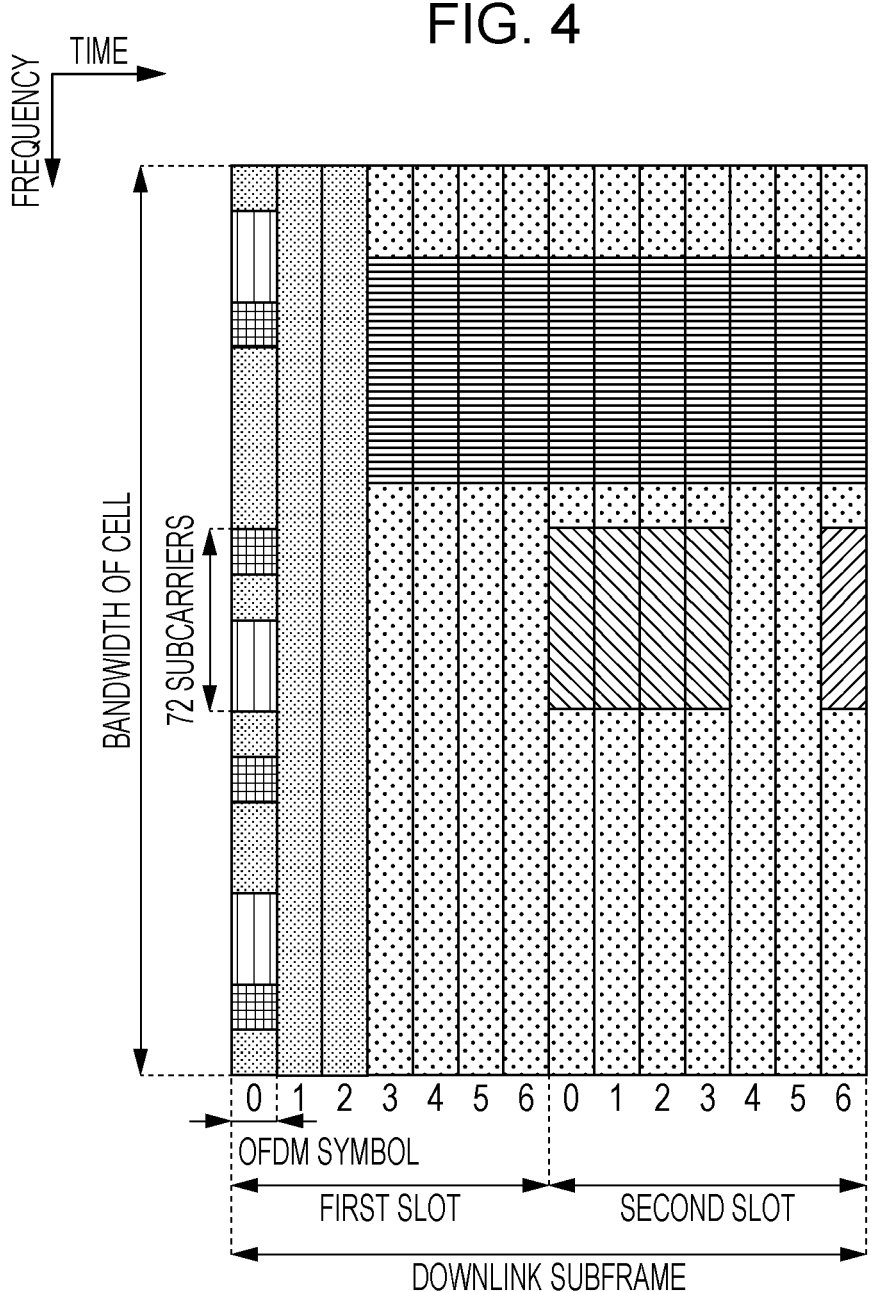
FIG. 4 is a diagram illustrating an example of the arrangement of physical channels and physical signals in a downlink subframe according to this embodiment.

FIG. 4 is a diagram illustrating an example of the arrangement of the physical channels and the physical signals in the downlink subframe according to this embodiment. In FIG. 4, a horizontal axis represents a time axis, and a vertical axis represents a frequency axis. The base station device 3 may transmit the downlink physical channels (PBCH, PCFICH, PHICH, PDCCH, EPDCCH and PDSCH) and the downlink physical signals (synchronization signals and downlink reference signals) in the downlink subframe. The PBCH is transmitted in only subframe 0 of the radio frame. The downlink reference signals are arranged in the resource elements that are distributed in the frequency domain and the time domain. For the sake of convenience in description, the downlink reference signals are not illustrated in FIG. 4.

In a PDCCH region, frequency multiplexing and time multiplexing may be performed on a plurality of PDCCHs. In an EPDCCH region, frequency multiplexing, time multiplexing, and spatial multiplexing may be performed on a plurality of EPDCCHs. In a PDSCH region, frequency multiplexing and spatial multiplexing may be performed on a plurality of PDSCHs. Time multiplexing may be performed on the PDCCH and the PDSCH or the EPDCCH. Frequency multiplexing may be performed on the PDSCH and the EPDCCH.

Figure 5:
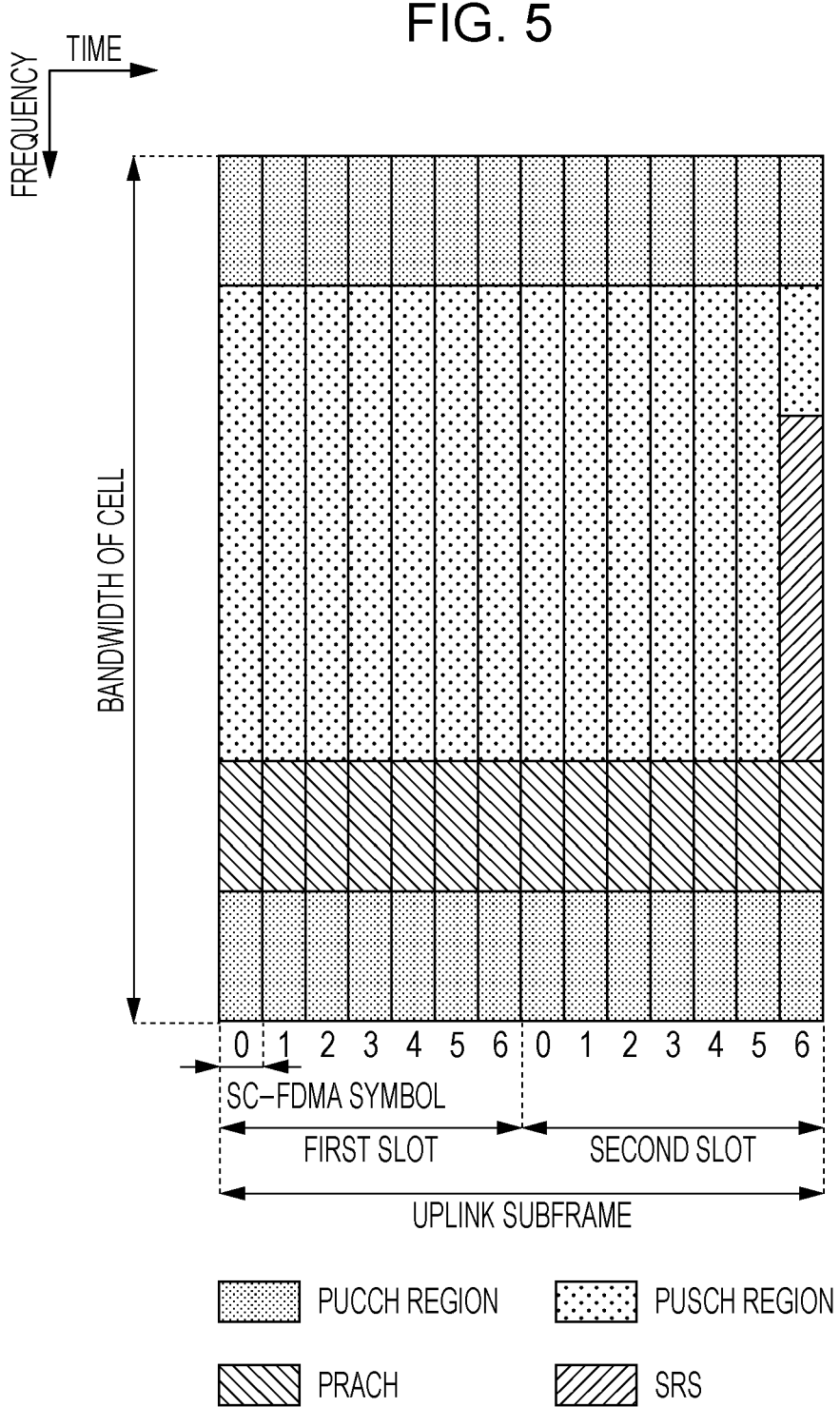
FIG. 5 is a diagram illustrating an example of the arrangement of physical channels and physical signals in an uplink subframe according to this embodiment.

FIG. 5 is a diagram showing an example of the arrangement of the physical channels and the physical signals in the uplink subframe according to this embodiment. In FIG. 5, a horizontal axis is a time axis, and a vertical axis is a frequency axis. The terminal device 1 may transmit the uplink physical channels (PUCCH, PUSCH and PRACH) and the uplink physical signals (DMRS and SRS) in the uplink subframe. In a PUCCH region, frequency multiplexing, time multiplexing and code multiplexing are performed on a plurality of PUCCHs. In a PUSCH region, frequency multiplexing and spatial multiplexing may be performed on a plurality of PUSCHs. Frequency multiplexing may be performed on the PUCCH and the PUSCH. The PRACHs may be arranged in a single subframe or over two subframes. Code multiplexing may be performed on the plurality of PRACHs.

The SRS is transmitted using the last SC-FDMA symbol in the uplink subframe. That is, the SRS is arranged in the last SC-FDMA symbol of the uplink subframe. The terminal device 1 is not capable of transmitting the SRS and the PUCCH/PUSCH/PRACH at the same time with a single SC-FDMA symbol of a single cell. The terminal device 1 can transmit the PUSCH and/or the PUCCH using an SC-FDMA symbol except for the last SC-FDMA symbol in a single uplink subframe of a single cell and transmit the SRS using the last SC-FDMA symbol in the uplink subframe. That is, the terminal device 1 can transmit both the SRS and the PUSCH/PUCCH in the single uplink subframe of the single cell. Time multiplexing is performed on the DMRS and the PUCCH or the PUSCH. For simplicity of illustration, the DMRS is not shown in FIG. 5.

Figure 6:
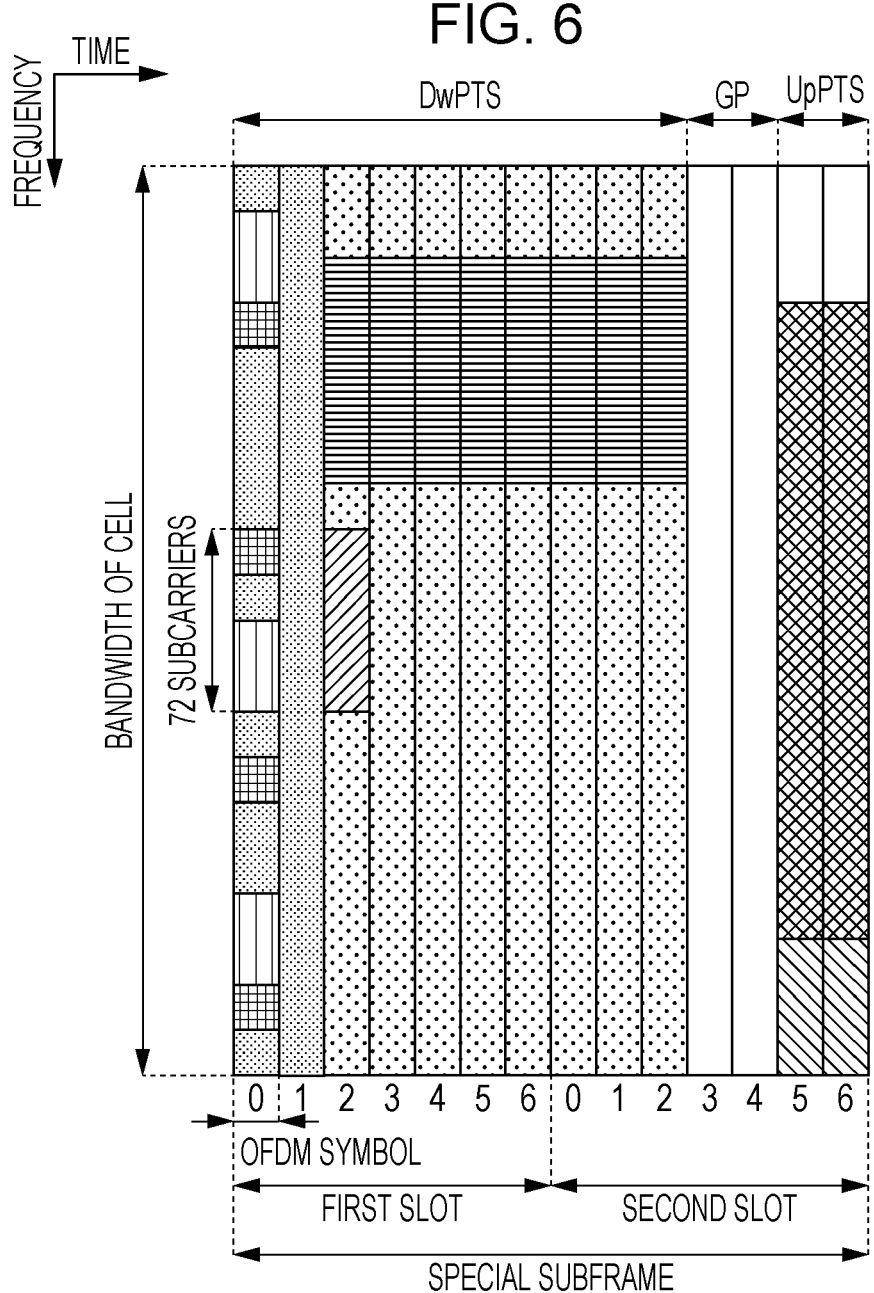
FIG. 6 is a diagram illustrating an example of the arrangement of physical channels and physical signals in a special subframe according to this embodiment.

FIG. 6 is a diagram showing an example of the arrangement of the physical channels and the physical signals in the special subframe according to this embodiment. In FIG. 6, a horizontal axis represents a time axis, and a vertical axis represents a frequency axis. In FIG. 6, the DwPTS includes first to tenth SC-FDMA symbols in the special subframe, the GP includes eleventh and twelfth SC-FDMA symbols in the special subframe, and the UpPTS includes thirteenth and fourteenth SC-FDMA symbols in the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 does not transmit the PBCH in the DwPTS of the special subframe. The terminal device 1 may transmit the PRACH and the SRS in UpPTS of the special subframe. That is, the terminal device 1 does not transmit the PUCCH, the PUSCH, and the DMRS in the UpPTS of the special subframe.

Figure 7:
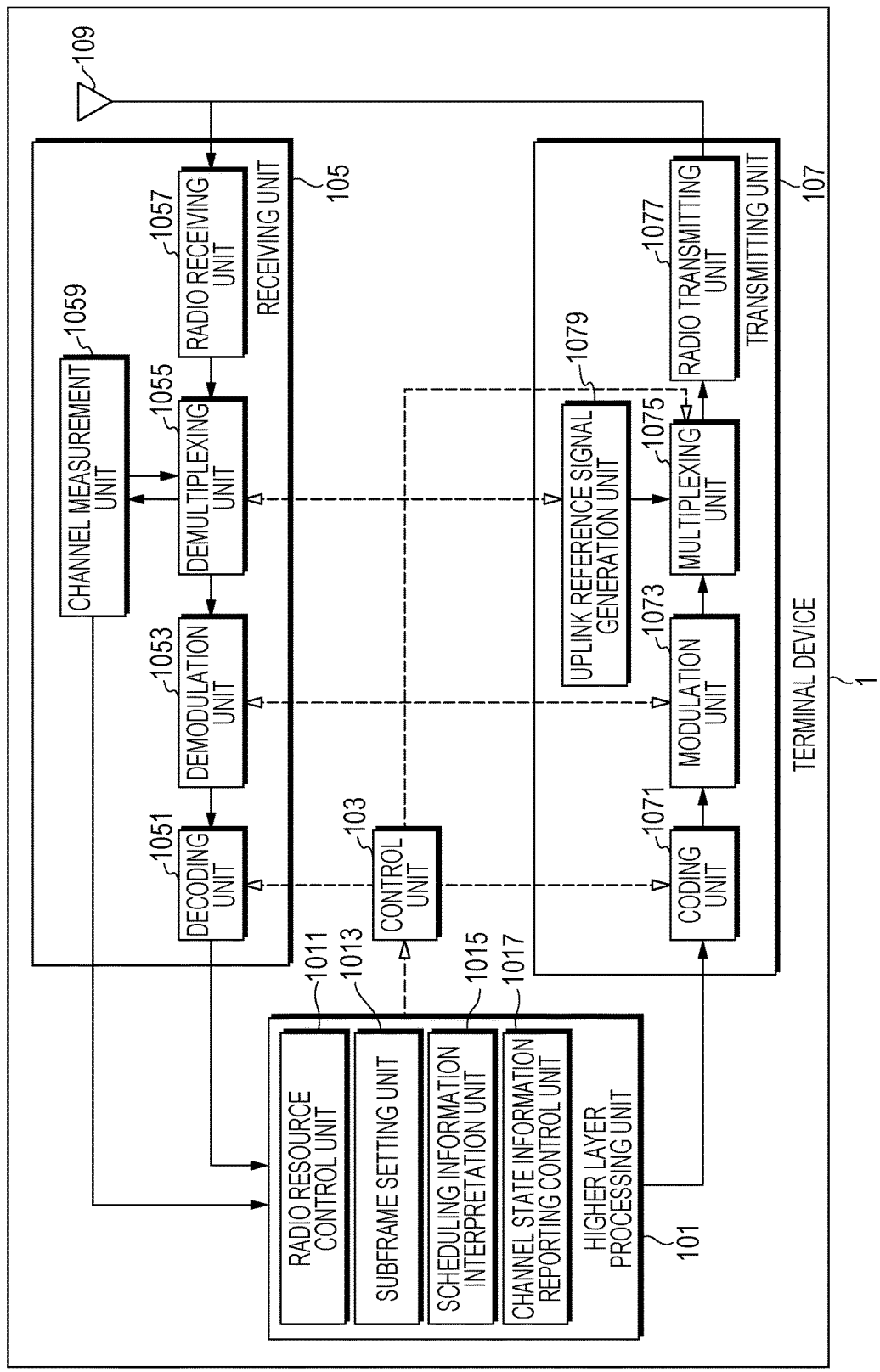
FIG. 7 is a schematic block diagram illustrating the structure of a terminal device 1 according to this embodiment.

FIG. 7 is a schematic block diagram showing the structure of the terminal device 1 according to this embodiment. As illustrated in the drawing, the terminal device 1 includes a higher layer processing unit 101, a control unit 103, a reception unit 105, a transmission unit 107, and a transmit/receive antenna 109. The higher layer processing unit 101 includes a radio resource control unit 1011, a subframe setting unit 1013, a scheduling information interpretation unit 1015, and a channel state information (CSI) reporting control unit 1017. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (transport block) generated by, for example, the operation of the user to the transmission unit 107. The higher layer processing unit 101 processes a MAC layer, a packet data convergence protocol (PDCP) layer, a radio link control (RLC) layer, and a radio resource control (RRC) layer.

The radio resource control unit 1011 of the higher layer processing unit 101 manages various kinds of setting information of the terminal device. In addition, the radio resource control unit 1011 generates information to be arranged in each uplink channel and outputs the information to the transmission unit 107.

The subframe setting unit 1013 of the higher layer processing unit 101 manages a first uplink reference UL-DL configuration (uplink reference configuration), a first downlink reference UL-DL configuration (downlink reference configuration), a second uplink reference UL-DL configuration, a second downlink reference UL-DL configuration, and a transmission direction UL-DL configuration (transmission direction configuration).

The subframe setting unit 1013 sets the first uplink reference UL-DL configuration, the first downlink reference UL-DL configuration, the second uplink reference UL-DL configuration, the second downlink reference UL-DL configuration, and the transmission direction UL-DL configuration. The subframe setting unit 1013 sets at least two subframe sets.

The scheduling information interpretation unit 1015 of the higher layer processing unit 101 interprets the DCI format (scheduling information) which is received through the reception unit 105, generates control information for controlling the reception unit 105 and the transmission unit 107 on the basis of the interpretation result of the DCI format, and outputs the control information to the control unit 103.

In addition, the scheduling information interpretation unit 1015 determines the time when the transmitting process and the receiving process are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI reporting control unit 1017 specifies a CSI reference resource. The CSI reporting control unit 1017 instructs the channel measurement unit 1059 to derive a CQI related to the CSI reference resource. The CSI reporting control unit 1017 instructs the transmission unit 107 to transmit the CQI. The CSI reporting control unit 1017 sets the configuration used in a case that the CQI is calculated by the channel measurement unit 1059.

The control unit 103 generates control signals for controlling the reception unit 105 and the transmission unit 107, on the basis of the control information from the higher layer processing unit 101. The control unit 103 outputs the generated control signals to the reception unit 105 and the transmission unit 107 to control the reception unit 105 and the transmission unit 107.

The reception unit 105 performs demultiplexing, demodulation, and decoding on the signal which is received from the base station device 3 through the transmit/receive antenna 109 in response to the control signal input from the control unit 103 and outputs the decoded information to the higher layer processing unit 101.

The radio reception unit 1057 converts (down-conversion) the downlink signal received through the transmit/receive antenna 109 into a baseband signal through orthogonal demodulation to remove an unnecessary frequency component, controls an amplification level such that a signal level is appropriately maintained, performs the orthogonal demodulation on the signal on the basis of the orthogonal component and an in-phase component of the received signal, and converts the orthogonal-demodulated analog signal into a digital signal. The radio reception unit 1057 performs a fast Fourier transform (FFT) on a signal obtained by removing a cyclic prefix (CP) guard interval (referred to as a GI) from the converted digital signal, and extracts a signal of the frequency domain.

The demultiplexing unit 1055 demultiplexes the extracted signal into the PHICH, the PDCCH, the EPDCCH, the PDSCH, and the downlink reference signal. In addition, the demultiplexing unit 1055 compensates for the channel of the PHICH, the PDCCH, the EPDCCH, and the PDSCH from the estimated value of the channel which is input from the channel measurement unit 1059. The demultiplexing unit 1055 outputs the demultiplexed downlink reference signal to the channel measurement unit 1059.

The demodulation unit 1053 multiplies the PHICH by a corresponding code to synthesize them, demodulates the synthesized signal using a binary phase shift keying (BPSK) modulation method, and outputs the demodulated signal to the decoding unit 1051. The decoding unit 1051 decodes the PHICH addressed to the terminal device and outputs the decoded HARQ indicator to the higher layer processing unit 101. The demodulation unit 1053 demodulates the PDCCH and/or the EPDCCH using a QPSK modulation method and outputs the demodulated PDCCH and/or EPDCCH to the decoding unit 1051. The decoding unit 1051 tries to decode the PDCCH and/or the EPDCCH. In a case that decoding has succeeded, the decoding unit 1051 outputs the decoded downlink control information and the RNTI corresponding to the downlink control information to the higher layer processing unit 101.

The demodulation unit 1053 demodulates the PDSCH using a modulation method notified by the downlink grant, such as quaternary PSK (QPSK) modulation, 16-quadrature amplitude modulation (QAM), or 64QAM, and outputs the demodulated PDSCH to the decoding unit 1051. The decoding unit 1051 performs decoding on the basis of information about the coding rate notified by downlink control information and outputs the decoded downlink data (TB) to the higher layer processing unit 101.

The channel measurement unit 1059 measures downlink path loss or a downlink channel state from the downlink reference signal which is input from the demultiplexing unit 1055 and outputs the measured downlink path loss or channel state to the higher layer processing unit 101. The channel measurement unit 1059 calculates the estimated value of the channel of the downlink channel from the downlink reference signal and outputs the estimated value to the demultiplexing unit 1055. The channel measurement unit 1059 performs channel measurement and/or interference measurement in order to calculate the CQI.

The transmission unit 107 generates an uplink reference signal in response to the control signal input from the control unit 103, codes and modulates the uplink data (TB) input from the higher layer processing unit 101, multiplexes the PUSCH, the PUSCH, and the generated uplink reference signal, and transmits the multiplexed signal to the base station device 3 through the transmit/receive antenna 109.

The coding unit 1071 performs coding, such as convolution cording or block coding, on the uplink control information input from the higher layer processing unit 101. In addition, the coding unit 1071 performs turbo cording on the basis of the information used to schedule the PUSCH.

The modulation unit 1073 modulates coded bits input from the coding unit 1071 using a modulation method notified by downlink control information such as BPSK, QPSK, 16QAM and 64QAM or a modulation method determined in advance for each channel. The modulation unit 1073 determines the number of data sequences on which spatial multiplexing is performed based on information used for scheduling of the PUSCH, maps a plurality of uplink data items transmitted on the same PUSCH to a plurality of sequences by using multiple-input multiple-output (MIMO) spatial multiplexing (SM), and performs precoding on the sequences.

The uplink reference signal generation unit 1079 generates sequences obtained by a predetermined rule (expression) on the basis of a physical cell identity (PCI, referred to as a cell ID) for identifying the base station device 3, a bandwidth in which the uplink reference signal is arranged, a cyclic shift notified by the uplink grant, and a parameter value for generating the DMRS sequence. The multiplexing unit 1075 rearranges modulated symbols of the PUSCH in parallel in response to the control signals input from the control unit 103 and performs a discrete Fourier transform (DFT) on the rearranged symbols. The multiplexing unit 1075 multiplexes the PUCCH and PUSCH signals and the generated uplink reference signal for each transmit antenna port. That is, the multiplexing unit 1075 arranges the PUCCH and PUSCH signals and the generated uplink reference signal in the resource elements for each transmit antenna port.

The radio transmission unit 1077 performs an inverse fast Fourier transform (IFFT) on the multiplexed signals to generate the SC-FDMA symbols, adds the CP to the generated SC-FDMA symbol to generate a baseband digital signal, and converts the baseband digital signal into an analog signal. Thereafter, the radio transmission unit generates an in-phase component and an orthogonal component of an intermediate frequency from the analog signal, removes extra frequency components for an intermediate frequency band, and converts (up-conversion) a signal having an intermediate frequency into a signal having a high frequency. Subsequently, the radio transmission unit removes extra frequency components, amplifies a power, and transmits the amplified signal to the transmit/receive antenna 109.

Figure 8:
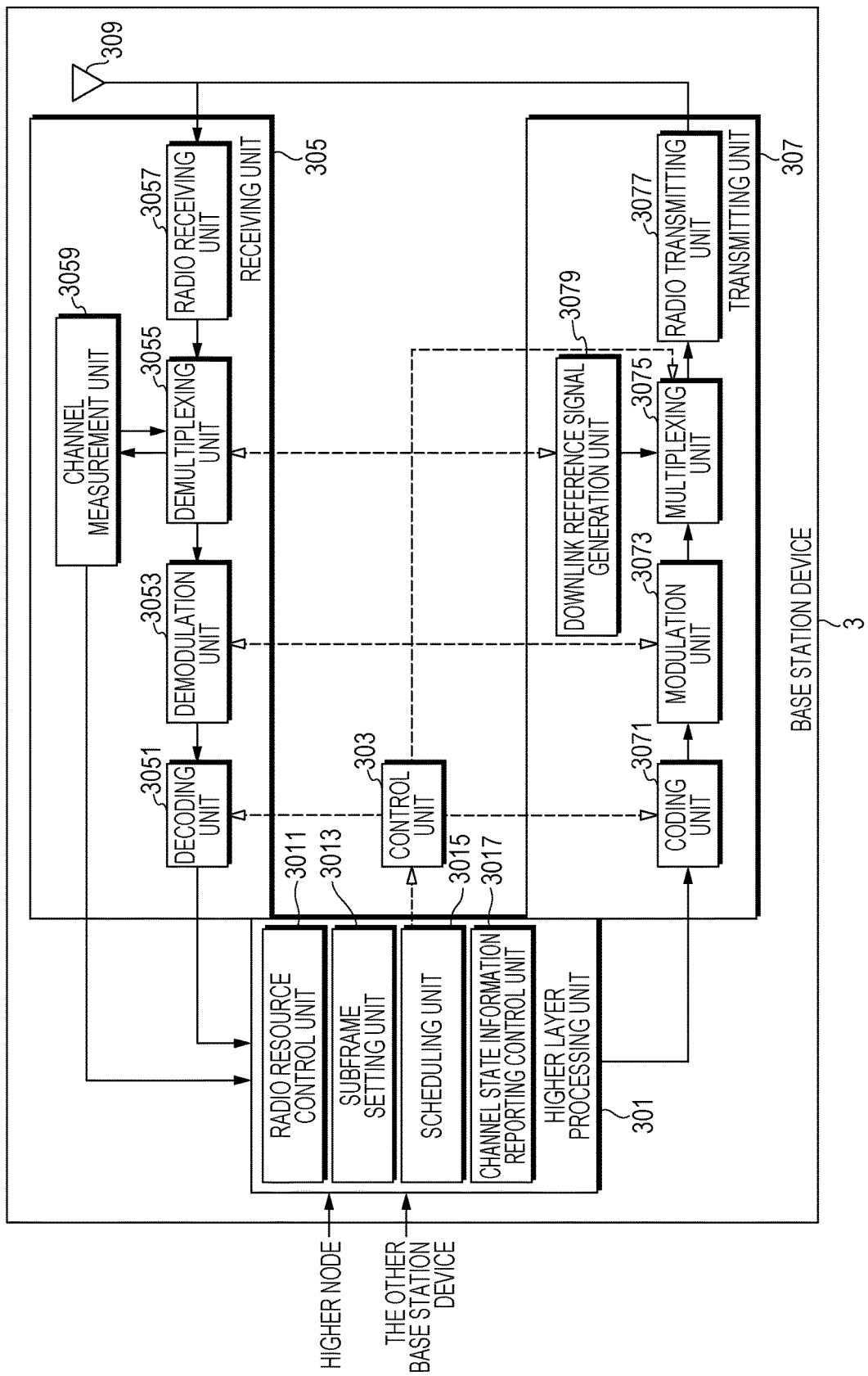
FIG. 8 is a schematic block diagram illustrating the structure of a base station device 3 according to this embodiment.

FIG. 8 is a schematic block diagram illustrating the structure of the base station device 3 according to this embodiment. As illustrated in the drawing, the base station device 3 includes a higher layer processing unit 301, a control unit 303, a reception unit 305, a transmission unit 307, and a transmit/receive antenna 309. The higher layer processing unit 301 includes a radio resource control unit 3011, a subframe setting unit 3013, a scheduling unit 3015, and a CSI reporting control unit 3017. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 processes a MAC layer, a PDCP layer, a RLC layer, and a RRC layer. In addition, the higher layer processing unit 301 generates control information for controlling the reception unit 305 and the transmission unit 307 and outputs the control information to the control unit 303.

The radio resource control unit 3011 of the higher layer processing unit 301 generates, for example, downlink data (transport block), system information, an RRC message, and a MAC control element (CE) to be arranged in downlink PDSCH or acquires a higher node and outputs the generated data or the acquired higher node to the transmission unit 307. In addition, the radio resource control unit 3011 manages various kinds of setting information of the terminal device 1.

The subframe setting unit 3013 of the higher layer processing unit 301 manages the first uplink reference UL-DL configuration, the first downlink reference UL-DL configuration, the second uplink reference UL-DL configuration, the second downlink reference UL-DL configuration, and the transmission direction UL-DL configuration for each terminal device 1.

The subframe setting unit 3013 sets the first uplink reference UL-DL configuration, the first downlink reference UL-DL configuration, the second uplink reference UL-DL configuration, the second downlink reference UL-DL configuration, and the transmission direction UL-DL configuration to each terminal device 1.

The subframe setting unit 3013 generates first information indicating the first uplink reference UL-DL configuration, second information indicating the first downlink reference UL-DL configuration, and third information indicating the transmission direction UL-DL configuration. The subframe setting unit 3013 transmits the first information, the second information, and the third information to the terminal device 1 through the transmission unit 307.

The base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration for the terminal device 1. In addition, the base station device 3 may determine the first uplink reference UL-DL configuration, the first downlink reference UL-DL configuration, the second uplink reference UL-DL configuration, the second downlink reference UL-DL configuration, and/or the transmission direction UL-DL configuration for the terminal device 1 in response to instructions from a higher node.

For example, the subframe setting unit 3013 may determine the first uplink reference UL-DL configuration, the first downlink reference UL-DL configuration, the second uplink reference UL-DL configuration, the second downlink reference UL-DL configuration and/or the transmission direction UL-DL configuration on the basis of an uplink traffic amount and a downlink traffic amount.

The subframe setting unit 3013 manages at least two subframe sets. The subframe setting unit 3013 may set at least two subframe sets to each terminal device 1. The subframe setting unit 3013 may set at least two subframe sets to each serving cell. The subframe setting unit 3013 may set at least two subframe sets to each CSI process.

The subframe setting unit 3013 transmits information indicating at least two subframe sets to the terminal device 1 through the transmission unit 307.

The scheduling unit 3015 of the higher layer processing unit 301 determines a frequency and a subframe to which the physical channels (PDSCH and PUSCH) are allocated, a coding rate, a modulation method of the physical channels (PDSCH and PUSCH) and a transmission power from the received channel state information, the channel quality and the estimated value of the channel input from the channel measurement unit 3059. The scheduling unit 3015 determines whether to schedule the downlink physical channel and/or the downlink physical signal or to schedule the uplink physical channel and/or the uplink physical signal in the flexible subframe. The scheduling unit 3015 generates control information (for example, a DCI format) for controlling the reception unit 305 and the transmission unit 307 on the basis of the scheduling result, and outputs the generated control information to the control unit 303.

The scheduling unit 3015 generates information which is used to schedule the physical channels (the PDSCH and the PUSCH) on the basis of the scheduling result. In addition, the scheduling unit 3015 determines the time when the transmitting process and the receiving process are performed, on the basis of the first uplink reference UL-DL configuration, the first downlink reference UL-DL configuration, the second uplink reference UL-DL configuration, the second downlink reference UL-DL configuration, and/or the transmission direction UL-DL configuration.

The CSI reporting control unit 3017 of the higher layer processing unit 301 controls a CSI report of the terminal device 1. The CSI reporting control unit 3017 transmits information indicating various configurations assumed to derive the CQI in the CSI reference resource by the terminal device 1 to the terminal device 1 through the transmission unit 307.

The control unit 303 generates control signals for controlling the reception unit 305 and the transmission unit 307, on the basis of the control information from the higher layer processing unit 301. The control unit 303 outputs the generated control signals to the reception unit 305 and the transmission unit 307 to control the reception unit 305 and the transmission unit 307.

The reception unit 305 performs demultiplexing, demodulation and decoding on the reception signal received from the terminal device 1 through the transmit/receive antenna 309 in response to the control signals input from the control unit 303, and outputs the decoded information to the higher layer processing unit 301. The radio reception unit 3057 converts the uplink signal received through the transmit/receive antenna 309 into a baseband signal through down conversion, and removes unnecessary frequency components. Thereafter, the radio reception unit controls an amplification level such that the signal level is appropriately maintained, performs orthogonal demodulation on the signal on the basis of the in-phase component and the orthogonal component of the received signal, and converts the orthogonal-demodulated analog signal into a digital signal.

The radio reception unit 3057 removes a portion corresponding to CP from the converted digital signal. The radio reception unit 3057 performs fast Fourier transform (FFT) on the signal from which the guard interval has been removed, extracts a signal in the frequency domain, and outputs the extracted signal to the demultiplexing unit 3055.

The demultiplexing unit 1055 demultiplexes the signal input from the radio reception unit 3057 into signals, such as the PUCCH, the PUSCH, and the uplink reference signal. The demultiplexing process is determined by the radio resource control unit 3011 of the base station device 3 in advance and is performed on the basis of the allocation information of the radio resources included in the uplink grant which is notified to each terminal device 1. In addition, the demultiplexing unit 3055 compensates for the channels of the PUCCH and the PUSCH from the estimated value of the channel input from the channel measurement unit 3059. The demultiplexing unit 3055 outputs the demultiplexed uplink reference signal to the channel measurement unit 3059.

The demodulation unit 3053 performs inverse discrete Fourier transform (IDFT) on the PUSCH to acquire modulated symbols, and demodulates the received signal using a modulation method which is predetermined for each of the modulated symbols of the PUCCH and the PUSCH, a predetermined modulation method such as BPSK, QPSK, 16QAM, or 64QAM, or a modulation method which is notified from the base station device to each terminal device 1 with the uplink grant in advance. The demodulation unit 3053 demultiplexes the modulated symbols of a plurality of uplink data items which are transmitted through the same PUSCH by the MIMO SM, on the basis of the number of spatial-multiplexed sequences, which are notified to each terminal device 1 by the uplink grant in advance, and information indicating precoding for the sequences.

The decoding unit 3051 decodes the coded bits of the demodulated PUCCH and PUSCH at a predetermined coding rate of a predetermined coding method or a coding rate which is notified from the base station device to the terminal device 1 with the uplink grant in advance and outputs the decoded uplink data and the uplink control information to the higher layer processing unit 101. In a case that the PUSCH is retransmitted, the decoding unit 3051 performs decoding using the coded bits, which have been input from the higher layer processing unit 301 and then stored in an HARQ buffer, and the demodulated coded bits. The channel measurement unit 309 measures, for example, the estimated value of the channel and the quality of the channel from the uplink reference signal which is input from the demultiplexing unit 3055 and outputs the measured values to the demultiplexing unit 3055 and the higher layer processing unit 301.

The transmission unit 307 generates a downlink reference signal, performs coding and modulation on the HARQ indicator, downlink control information, and downlink data input from the higher layer processing unit 301, multiplexes the PHICH, the PDCCH, the EPDCCH, the PDSCH, and the downlink reference signal, and transmits the signals to the terminal device 1 through the transmit/receive antenna 309, in response to the control signal input from the control unit 303.

The coding unit 3071 codes the HARQ indicator, downlink control information, and downlink data input from the higher layer processing unit 301 using a predetermined coding method, such as block coding, convolution coding, or turbo coding, or the coding method determined by the radio resource control unit 3011. The modulation unit 3073 modulates the coded bits input from the coding unit 3071 using a predetermined modulation method, such as BPSK, QPSK, 16QAM, or 64QAM, or the modulation method determined by the radio resource control unit 3011.

The downlink reference signal generation unit 3079 generates, as the downlink reference signal, the sequence which has been known to the terminal device 1 and is calculated according to a predetermined rule on the basis of, for example, a physical cell identity (PCI) for identifying the base station device 3. The multiplexing unit 3075 multiplexes the modulated symbol of each modulated channel and the generated downlink reference signal. That is, the multiplexing unit 3075 arranges the modulated symbol of each modulated channel and the generated downlink reference signal in the resource elements.

The radio transmission unit 3077 performs inverse fast Fourier transform (IFFT) on the multiplexed modulated symbol, performs modulation using the OFDM method, and adds the guard interval to the OFDM symbol on which the OFDM modulation has been performed. Subsequently, the radio transmission unit generates a baseband digital signal, converts the baseband digital signal into an analog signal, removes extra frequency components by a low pass filter, and performs up-conversion into a carrier frequency. Thereafter, the radio transmission unit amplifies a power, and outputs and transmits the amplified power through the transmit/receive antenna 309.

Next, the first uplink reference uplink-downlink configuration (uplink reference UL-DL configuration), the first downlink reference uplink-downlink configuration (downlink reference UL-DL configuration), the second uplink reference UL-DL configuration, the second downlink reference UL-DL configuration, and the transmission direction uplink-downlink configuration (transmission direction UL-DL configuration) will be described.

The first uplink reference UL-DL configuration, the first downlink reference UL-DL configuration, the second uplink reference UL-DL configuration, the second downlink reference UL-DL configuration, and the transmission direction UL-DL configuration are defined by uplink-downlink configuration (UL-DL configuration).

The uplink-downlink configuration is a configuration related to a pattern of the subframe in the radio frame. The uplink-downlink configuration indicates that each subframe in the radio frame is any one of the downlink subframe, the uplink subframe and the special subframe.

That is, the first uplink reference UL-DL configuration, the second uplink reference UL-DL configuration, the first downlink reference UL-DL configuration, the second downlink reference UL-DL configuration, and the transmission direction UL-DL configuration are defined by a pattern of the downlink subframes, the uplink subframes and the special subframes in the radio frame.

The pattern of the downlink subframe, the uplink subframe and the special subframe indicates that each of subframes #0 to #9 is any one of the downlink subframe, the uplink subframe and the special subframe. Preferably, the pattern thereof is represented by any combination in which D, U and S (respectively indicating the downlink subframe, the uplink subframe and the special subframe) have a length of 10. More preferably, a head (that is, a subframe #0) is D, and a second (that is, a subframe 1) is S.

FIG. 9 is a table illustrating an example of the uplink-downlink configuration according to this embodiment. In FIG. 9, D indicates the downlink subframe, U indicates the uplink subframe, and S indicates the special subframe.

In FIG. 9, a subframe 1 in the radio frame is constantly the special subframe. In FIG. 9, subframes 0 and 5 are constantly reserved for downlink transmission, and a subframe 2 is constantly reversed for uplink transmission.

In FIG. 9, in a case that the downlink-uplink switch-point periodicity is 5 ms, a subframe 6 in the radio frame is the special subframe. In a case that the downlink-uplink switch-point periodicity is 10 ms, the subframe 6 in the radio frame is the downlink subframe.

The first uplink reference UL-DL configuration is also referred to as a first parameter, a first configuration, or a serving cell uplink-downlink configuration. The first downlink reference UL-DL configuration is also referred to as a second parameter or a second configuration. The second uplink reference UL-DL configuration is also referred to as a third parameter or a third configuration. The second downlink reference UL-DL configuration is also referred to as a fourth parameter or a fourth configuration. The transmission direction UL-DL configuration is also referred to as a fifth parameter or a fifth configuration.

The setting of uplink-downlink configuration i as the first or second uplink reference UL-DL configuration is referred to the setting of first or second uplink reference UL-DL configuration i. The setting of uplink-downlink configuration i as the first or second downlink reference UL-DL configuration is referred to as the setting of first or second downlink reference UL-DL configuration i. The setting of uplink-downlink configuration i as the transmission direction UL-DL configuration is referred to as the setting of transmission direction UL-DL configuration i.

Next, a method for setting the first uplink reference UL-DL configuration, the first downlink reference UL-DL configuration, and the transmission direction UL-DL configuration will be described.

The base station device 3 sets the first uplink reference UL-DL configuration, the first downlink reference UL-DL configuration, and the transmission direction UL-DL configuration. The base station device 3 may insert first information (TDD-Config) indicating the first uplink reference UL-DL configuration, second information indicating the first downlink reference UL-DL configuration, and third information indicating the transmission direction UL-DL configuration into at least one of an MIB, a system information block type 1 message, a system information message, an RRC message, a MAC control element (CE), and physical layer control information (for example, a DCI format) and transmit the information items. In addition, the base station device 3 may insert the first information, the second information, and the third information into any one of the MIB, the system information block type 1 message, the system information message, the RRC message, the MAC control element (CE), and the physical layer control information (for example, a DCI format), depending on the situation.

The first uplink reference UL-DL configuration, the second uplink reference UL-DL configuration, the first downlink reference UL-DL configuration, the second downlink reference UL-DL configuration, and the transmission direction UL-DL configuration may be defined for each of a plurality of serving cells.

The base station device 3 transmits the first information, the second information, and the third information for each serving cell to the terminal device 1 to which the plurality of serving cells are set. However, the first information, the second information, and the third information may be defined for each serving cell.

The base station device 3 may transmit first information on a primary cell, second information on the primary cell, third information on the primary cell, first information on a secondary cell, second information on the secondary cell, and third information on the secondary cell to the terminal device 1 to which two serving cells, that is, one primary cell and one secondary cell are set.

The terminal device 1 to which a plurality of serving cells are set may set the first uplink reference UL-DL configuration, the first downlink reference UL-DL configuration, and the transmission direction DL-UL configuration to each serving cell on the basis of the first information, the second information, and the third information.

The terminal device 1 to which two serving cells, that is, one primary cell and one secondary cell are set may set the first uplink reference UL-DL configuration for the primary cell, the first downlink reference UL-DL configuration for the primary cell, the transmission direction DL-UL configuration for the primary cell, the first uplink reference UL-DL configuration for the secondary cell, the first downlink reference UL-DL configuration for the secondary cell, and the transmission direction DL-UL configuration for the secondary cell.

It is preferable that the first information on the primary cell be included in the system information block type 1 message or the RRC message. It is preferable that the first information on the secondary cell be included in the RRC message. It is preferable that the second information on the primary cell be included in the system information block type 1 message, the system information message, or the RRC message. It is preferable that the second information on the secondary cell be included in the RRC message. It is preferable that the third information be included in the physical layer control information (for example, a DCI format).

It is preferable that the first information be common to a plurality of terminal devices 1 in the cell. The second information may be common to the plurality of terminal devices 1 in the cell or it may be used only for the terminal device 1. The third information may be common to the plurality of terminal devices 1 in the cell or it may be used only for the terminal device 1.

The system information block type 1 message is initially transmitted through the PDSCH in a subframe 5 of a radio frame which satisfies SFN mod 8=0, and is repeated in subframes 5 of the other radio frames which satisfy SFN mod 2=0. The system information block type 1 message includes information indicating the structure of the special subframe (lengths of DwPTS, GP and UpPTS). The system information block type 1 message is information unique to the cell.

The system information message is transmitted through the PDSCH. The system information message is information unique to the cell. The system information message includes system information block X in addition to the system information block type 1.

The RRC message is transmitted through the PDSCH. The RRC message is information/signal which is processed in the RRC layer. The RRC message may be common to the plurality of terminal devices 1 in the cell or it may be used only for a specific terminal device 1.

The MAC CE is transmitted through the PDSCH. The MAC CE is information/signal which is processed in the MAC layer.

In a case of receiving the physical layer control information (for example, a DCI format) including the first information and/or the second information and/or the third information through the downlink physical channel (for example, PDCCH/EPDCCH) in a subframe n−k, it is preferable that the terminal device 1 set (validate) the first uplink reference UL-DL configuration and/or the first downlink reference UL-DL configuration and/or the transmission direction UL-DL configuration in a subframe n. For example, k is 4 or 8. For example, a subframe n+k is used to transmit the HARQ- ACK (ACK) for the downlink physical channel (for example, PDCCH/EPDCCH) which is used to transmit the physical layer control information (for example, a DCI format). For example, k is determined on the basis of the table shown in FIG. 21 and the current first or second downlink reference UL-DL configuration.

In a case of receiving the physical layer control information (for example, a DCI format) including the third information in a radio frame n–k through the downlink physical channel (for example, PDCCH/EPDCCH), it is preferable that the terminal device 1 set (validate) the transmission direction UL-DL configuration in a radio frame n. For example, k is 1. The third information received in the radio frame n–k may be valid only for the radio frame n.

Figure 10:
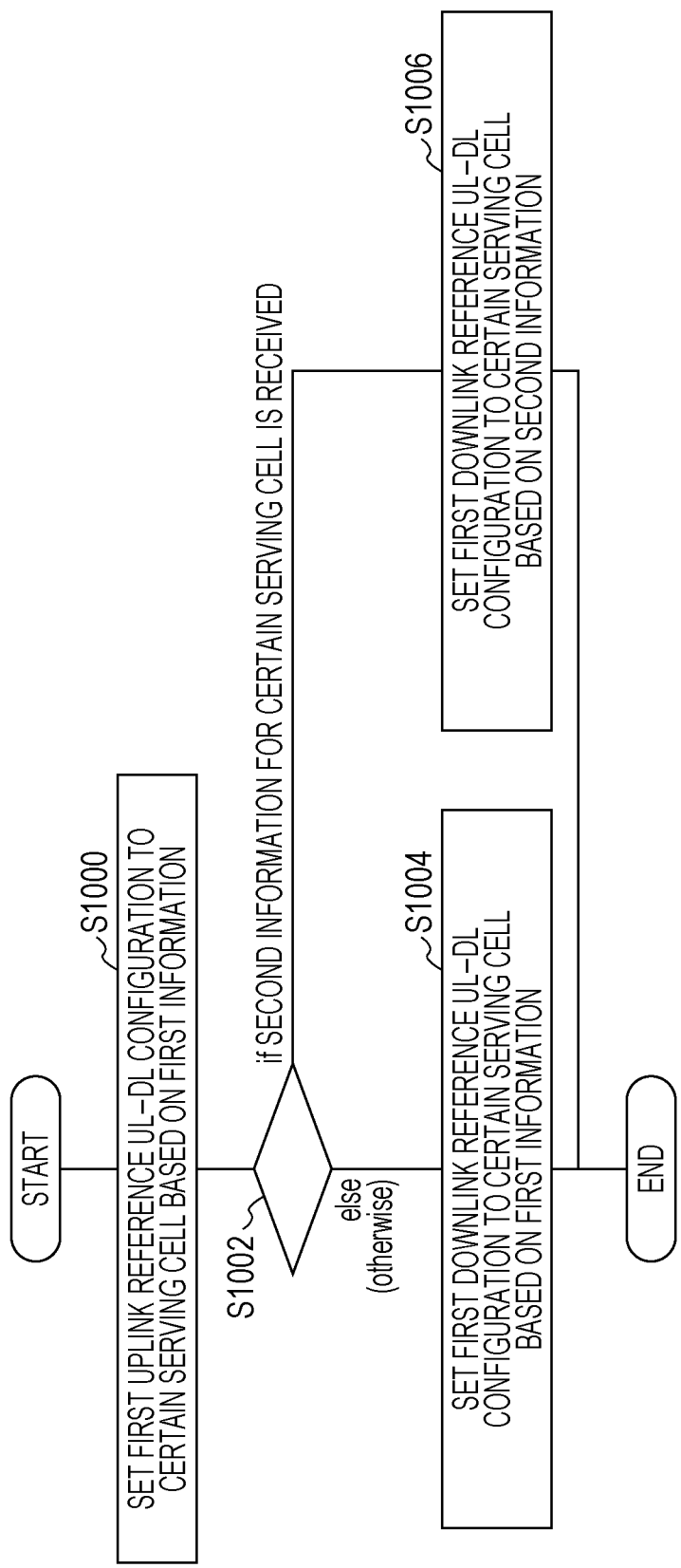
FIG. 10 is a flowchart illustrating a method for setting a first uplink reference UL-DL configuration and a first downlink reference UL-DL configuration in this embodiment.

FIG. 10 is a flowchart illustrating a method for setting the first uplink reference UL-DL configuration and the first downlink reference UL-DL configuration in this embodiment. The terminal device 1 performs the setting method shown in FIG. 10 for each of a plurality of serving cells.

The terminal device 1 sets the first uplink reference UL-DL configuration to a given serving cell on the basis of the first information (S1000). The terminal device 1 determines whether the second information on the given serving cell is received (S1002). In a case that the second information on the given serving cell is received, the terminal device 1 sets the first downlink reference UL-DL configuration to the given serving cell on the basis of the second information on the given serving cell (S1006). In a case that the second information on the given serving cell is not received (else/otherwise), the terminal device 1 sets the first downlink reference UL-DL configuration to the given serving cell on the basis of the first information on the given serving cell (S1004).

The serving cell to which the first uplink reference UL-DL configuration and the first downlink reference UL-DL configuration are set on the basis of the first information is referred to as a serving cell to which a dynamic TDD is not set. The serving cell to which the first downlink reference UL-DL configuration is set on the basis of the second information is referred to as a serving cell to which the dynamic TDD is not set.

The terminal device 1 receives the second information, and determines a subframe capable of transmitting an uplink signal on the basis of the second information. Thereafter, the terminal device 1 monitors the third information. In a case of receiving the third information, the terminal device 1 determines a subframe capable of transmitting an uplink signal on the basis of the third information.

For example, the base station device 3 transmits the third information to the terminal device 1 by using the PDCCH/EPDCCH. The third information controls an operation of the dynamic TDD within coverage of the base station device 3 (cell). The third information is transmitted and received in a common search space (CSS) or an UE-specific search space (USS).

The CSS is a region where the PDCCH/EPDCCH is monitored in common by the plurality of terminal devices 1. The USS is a region that is defined based on at least C-RNTI. The C-RNTI is an identifier that is allocated uniquely to the terminal device 1.

The C-RNTI may be used to transmit the DCI format including the third information (information designating a transmission direction for a subframe). The RNTI different from the C-RNTI and the SPS C-RNTI may be used to transmit the DCI format including the third information (information designating a transmission direction for a subframe). The RNTI is referred to as an X-RNTI. That is, the CRC parity bit added to the DCI format including information of the third information is scrambled with the C-RNTI or the X-RNTI.

The subframe that monitors the PDCCH/EPDCCH including the third information by the terminal device 1 may be restricted. The base station device 3 may control the subframe that monitors the PDCCH/EPDCCH including the third information by the terminal device 1. The base station device 3 may transmit information designating the subframe that monitors the PDCCH/EPDCCH including the third information by the terminal device 1 to the terminal device 1.

For example, the PDCCH/EPDCCH including the third information may be arranged at an interval of 10 subframes. For example, the terminal device 1 monitors the third information at an interval of 10 subframes. The subframes where the PDCCH/EPDCCH including the third information may be arranged may be determined in advance. For example, the third information may be arranged at the subframe 0 or 5 of the radio frame.

The terminal device 1 that starts the operation of the dynamic TDD monitors the PDCCH/EPDCCH including the third information in the subframe where the PDCCH/EPDCCH including the third information may be arranged.

The terminal device 1 tries to perform decoding on the received signal, and determines whether or not the PDCCH/EPDCCH including the third information is detected. In a case that the PDCCH/EPDCCH including the third information is detected, the terminal device 1 determines the subframe capable of transmitting the uplink signal on the basis of the detected third information. In a case that the PDCCH/EPDCCH including the third information is not detected, the terminal device 1 may maintain the determination that has been performed so far on the subframe capable of transmitting the uplink signal.

Next, a method for setting the second uplink reference UL-DL configuration will be described.

In a case that the plurality of serving cells are set to the terminal device 1 and the first uplink reference UL-DL configurations for at least two serving cells are different, the terminal device 1 and the base station device 3 set the second uplink reference UL-DL configurations.

Except a case that the plurality of serving cells are set to the terminal device 1 and the first uplink reference UL-DL configurations for at least two serving cells are different, terminal device 1 and the base station device 3 may not set the second uplink reference UL-DL configurations.

Except a case that the first uplink reference UL-DL configurations for at least two serving cells are different, the first uplink reference UL-DL configurations for all serving cells are the same. In a case that one serving cell is set to the terminal device 1, the terminal device 1 and the base station device 3 may not set the second uplink reference UL-DL configurations.

Except a case that the first uplink reference UL-DL configurations for at least two serving cells are different, the first uplink reference UL-DL configurations for all serving cells are the same. In a case that one serving cell is set to the terminal device 1, the terminal device 1 and the base station device 3 may not set the second uplink reference UL-DL configurations.

Figure 11:
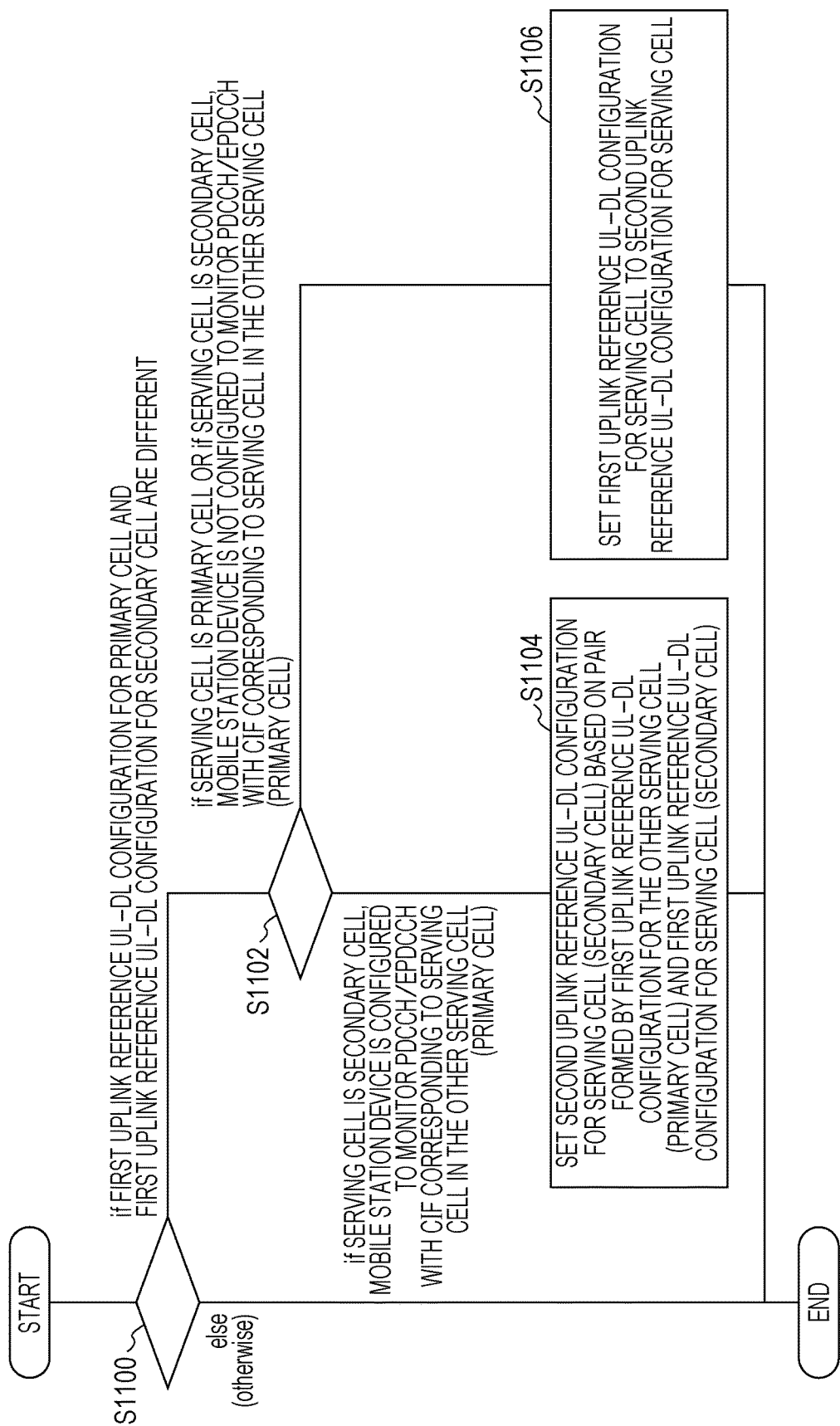
FIG. 11 is a flowchart illustrating a method for setting a second uplink reference UL-DL configuration in this embodiment.

FIG. 11 is a flowchart illustrating a method for setting the second uplink reference UL-DL configuration in this embodiment. In FIG. 11, one primary cell and one secondary cell are set to the terminal device 1. The terminal device 1 performs the setting method of FIG. 11 on the primary cell and the secondary cell.

The terminal device 1 determines whether or not the first uplink reference UL-DL configuration for the primary cell and the first uplink reference UL-DL configuration for the secondary cell are different (S1100). In a case that the first uplink reference UL-DL configuration for the primary cell and the first uplink reference UL-DL configuration for the secondary cell are the same, the terminal device 1 ends a process of setting the second uplink reference UL-DL configuration without setting the second uplink reference UL-DL configuration.

In a case that the first uplink reference UL-DL configuration for the primary cell is different from the first uplink reference UL-DL configuration for the secondary cell, the terminal device 1 determines whether the serving cell is the primary cell or the secondary cell and/or whether the terminal device 1 is configured so as to monitor the PDCCH/EPDCCH with a carrier indicator field (CIF) corresponding to the serving cell in the other serving cell (S1102).

In a case that the serving cell is the secondary cell and the terminal device 1 is configured so as to monitor the PDCCH/EPDCCH with the CIF corresponding to the serving cell (secondary cell) in the other serving cell (primary cell), the terminal device 1 sets the second uplink reference UL-DL configuration for the serving cell (secondary cell) on the basis of a pair which is formed by the first uplink reference UL-DL configuration for the other serving cell (primary cell) and the first uplink reference UL-DL configuration for the serving cell (secondary cell) (S1104).

In S1104, the terminal device 1 sets the second uplink reference UL-DL configuration for the serving cell (secondary cell) on the basis of the table shown in FIG. 12. FIG. 12 is a diagram illustrating the correspondence between the pair which is formed by the first uplink reference UL-DL configuration for the other serving cell (primary cell) and the first uplink reference UL-DL configuration for the serving cell (secondary cell) and the second uplink reference UL-DL configuration for the secondary cell in this embodiment.

In FIG. 12, the primary cell UL-DL configuration refers to the first uplink reference UL-DL configuration for the other serving cell (primary cell). In FIG. 12, the secondary cell UL-DL configuration refers to the first uplink reference UL-DL configuration for the serving cell (secondary cell).

For example, in a case that a first uplink reference UL-DL configuration 0 is set to the other serving cell (primary cell) and a first uplink reference UL-DL configuration 2 is set to the serving cell (secondary cell), a second uplink reference UL-DL configuration 1 is set to the secondary cell.

In a case that the serving cell is the primary cell or the serving cell is the secondary cell and the terminal device 1 is not configured so as to monitor the PDCCH/EPDCCH with the CIF corresponding to the serving cell (secondary cell) in the other serving cell (primary cell), the first uplink reference UL-DL configuration for the serving cell is set to the second uplink reference UL-DL configuration for the serving cell (S1106).

The base station device 3 sets the second uplink reference UL-DL configuration on the basis of the setting method shown in FIG. 11.

The monitoring of the PDCCH/EPDCCH with the CIF means that the terminal device 1 tries to decode the PDCCH or the EPDCCH according to the DCI format including the CIF. The CIF is a field to which a carrier indicator is mapped. The value of the carrier indicator indicates the serving cell corresponding to the DCI format related to the carrier indicator.

The terminal device 1 which is configured so as to monitor the PDCCH/EPDCCH with the CIF corresponding to the serving cell in the other serving cell monitors the PDCCH/EPDCCH with the CIF in the other serving cell.

It is preferable that the terminal device 1 which is configured so as to monitor the PDCCH/EPDCCH with the CIF corresponding to the serving cell in the other serving cell receive the third information on the serving cell through the PDCCH/EPDCCH in the other serving cell.

The terminal device 1 which is not configured so as to monitor the PDCCH/EPDCCH with the CIF corresponding to the serving cell in the other serving cell monitors the PDCCH/EPDCCH with the CIF or the PDCCH/EPDCCH without the CIF in the serving cell.

It is preferable that the terminal device 1 which is not configured so as to monitor the PDCCH/EPDCCH with the CIF corresponding to the serving cell in the other serving cell receive the third information on the serving cell through the PDCCH/EPDCCH in the serving cell.

The PDCCH/EPDCCH for the primary cell is transmitted in the primary cell. It is preferable that the third information on the primary cell be transmitted through the PDCCH/EPDCCH of the primary cell.

The base station device 3 transmits, to the terminal device 1, a parameter (cif-Presence-r10) indicating whether or not the CIF is included in the DCI format transmitted in the primary cell.

The base station device 3 transmits, to the terminal device 1, a parameter (CrossCarrierSchedulingConfig-r10) related to cross carrier scheduling for each secondary cell.

The parameter (CrossCarrierSchedulingConfig-r10) includes a parameter (schedulingCellInfo-r10) indicating whether or not the PDCCH/EPDCCH corresponding to a related secondary cell is transmitted in the secondary cell or the other serving cell.

In a case that the parameter (schedulingCellInfo-r10) indicates that the PDCCH/EPDCCH corresponding to the related secondary cell is transmitted in the secondary cell, the parameter (schedulingCellInfo-r10) includes the parameter (cif-Presence-r10) indicating whether or not the CIF is included in the DCI format transmitted in the secondary cell.

In a case that the parameter (schedulingCellInfo-r10) indicates that the PDCCH/EPDCCH corresponding to the related secondary cell is transmitted in the other serving cell, the parameter (schedulingCellInfo-r10) includes a parameter (schedulingCellId) indicating whether or not the downlink allocation for the related secondary cell is transmitted in any serving cell.

Next, a method for setting the second downlink reference UL-DL configuration will be described.

In a case that the plurality of serving cells are set to the terminal device 1 and the first downlink reference UL-DL configurations for at least two serving cells are different from each other, the terminal device 1 and the base station device 3 set the second downlink reference UL-DL configurations. The terminal device 1 and the base station device 3 may not set the second downlink reference UL-DL configuration, except a case that the plurality of serving cells are set to the terminal device 1 and the first downlink reference UL-DL configurations for at least two serving cells are different from each other.

In some cases, the first downlink reference UL-DL configurations for all serving cells are the same, except a case that the first downlink reference UL-DL configurations for at least two serving cells are different from each other. In a case that one serving cell is set to the terminal device 1, the terminal device 1 and the base station device 3 may not set the second downlink reference UL-DL configurations.

Figure 13:
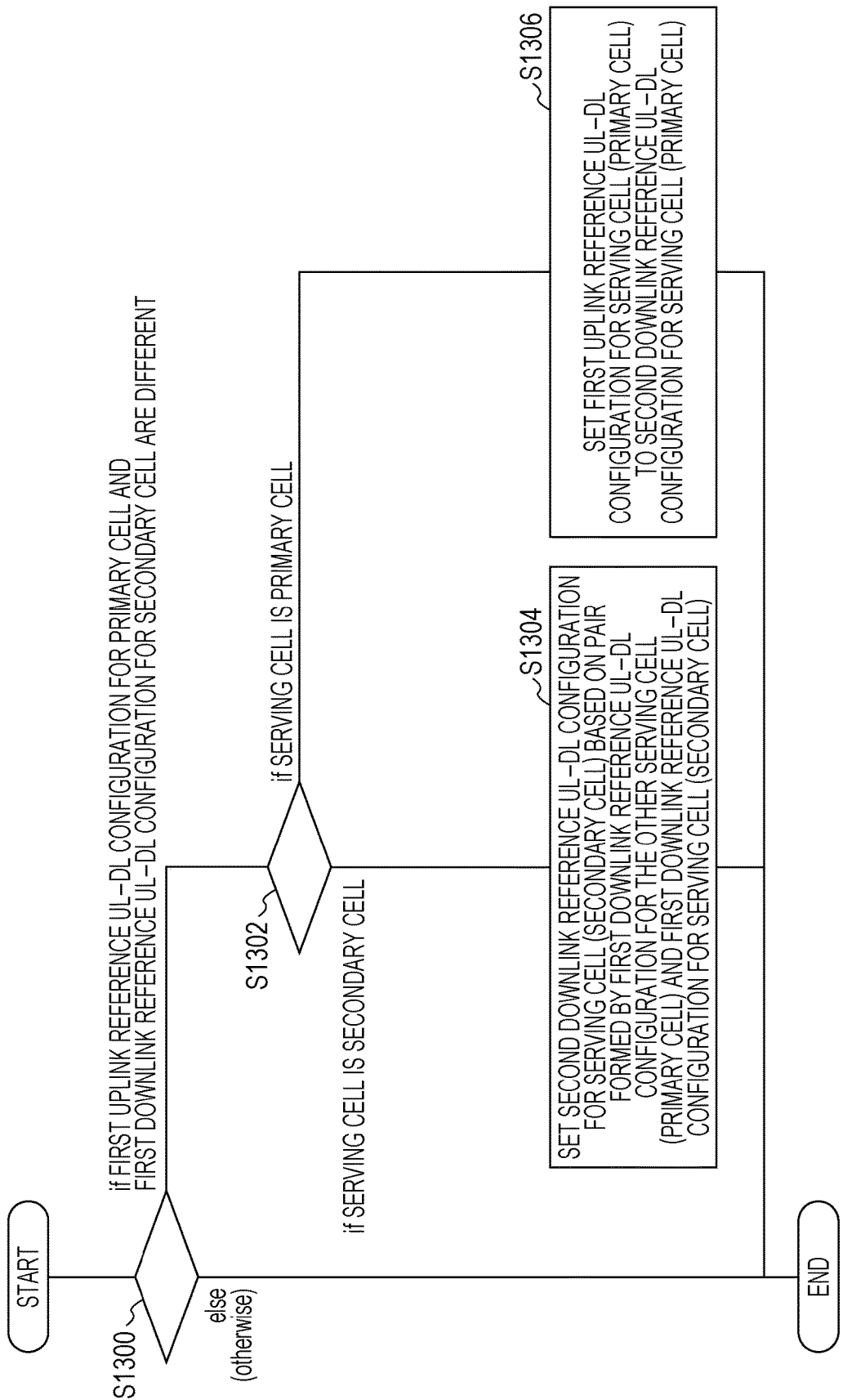
FIG. 13 is a flowchart illustrating a method for setting a second downlink reference UL-DL configuration in this embodiment.

FIG. 13 is a flowchart illustrating a method for setting the second downlink reference UL-DL configuration in this embodiment. In FIG. 13, one primary cell and one secondary cell are set to the terminal device 1. The terminal device 1 performs the setting method shown in FIG. 13 for the primary cell and the secondary cell.

The terminal device 1 determines whether the first downlink reference UL-DL configuration for the primary cell is different from the first downlink reference UL-DL configuration for the secondary cell (S1300). In a case that the first downlink reference UL-DL configuration for the primary cell is the same as the first downlink reference UL-DL configuration for the secondary cell, the terminal device 1 does not set the second downlink reference UL-DL configuration and ends the process of setting the second downlink reference UL-DL configuration.

In a case that the first downlink reference UL-DL configuration for the primary cell is different from the first downlink reference UL-DL configuration for the secondary cell, the terminal device 1 determines whether the serving cell is the primary cell or the secondary cell (S1302).

In a case that the serving cell is the secondary cell, the terminal device 1 sets the second uplink reference UL-DL configuration to the serving cell (secondary cell) on the basis of a pair which is formed by the first downlink reference UL-DL configuration for the other serving cell (primary cell) and the first downlink reference UL-DL configuration for the serving cell (secondary cell) (S1304).

In S1304, the terminal device 1 sets the second downlink reference UL-DL configuration for the serving cell (secondary cell) on the basis of the table shown in FIG. 14. FIG. 14 is a diagram illustrating the correspondence between the pair which is formed by the first downlink reference UL-DL configuration for the primary cell and the first downlink reference UL-DL configuration for the secondary cell and the second downlink reference UL-DL configuration for the secondary cell in this embodiment.

In FIG. 14, the primary cell UL-DL configuration refers to the first downlink reference UL-DL configuration for the primary cell. In FIG. 14, the secondary cell UL-DL configuration refers to the first downlink reference UL-DL configuration for the secondary cell.

In a case that the pair which is formed by the first downlink reference UL-DL configuration for the primary cell and the first downlink reference UL-DL configuration for the secondary cell belongs to a set 1 in FIG. 14, the second downlink reference UL-DL configuration for the secondary cell is defined in the set 1.

In a case that the terminal device 1 is not configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to a set 2 in FIG. 14, the second downlink reference UL-DL configuration for the secondary cell is defined in the set 2.

In a case that the terminal device 1 is not configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to a set 3 in FIG. 14, the second downlink reference UL-DL configuration for the secondary cell is defined in the set 3.

In a case that the terminal device 1 is configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to a set 4 in FIG. 14, the second downlink reference UL-DL configuration for the secondary cell is defined in the set 4.

In a case that the terminal device 1 is configured so as to monitor the PDCCH/EPDCCH with the CIF corresponding to the secondary cell in the primary cell and the pair which is formed by the first downlink reference UL-DL configuration for the primary cell and the first downlink reference UL-DL configuration for the secondary cell belongs to a set 5 in FIG. 14, the second downlink reference UL-DL configuration for the secondary cell is defined in the set 5.

For example, in a case that first downlink reference UL-DL configuration 1 is set to the primary cell and a first downlink reference UL-DL configuration 0 is set to the secondary cell, a second downlink reference UL-DL configuration 1 is set to the secondary cell.

When the serving cell is the primary cell, the first downlink reference UL-DL configuration for the serving cell (primary cell) is set to the second downlink reference UL-DL configuration for the serving cell (primary cell) (S1306).

The base station device 3 also sets the second downlink reference UL-DL configuration on the basis of the setting method shown in FIG. 13.

Next, the first uplink reference UL-DL configuration will be described.

The first uplink reference UL-DL configuration is at least used to specify the subframe which is capable or incapable of performing uplink transmission in the serving cell.

The terminal device 1 does not perform uplink transmission in the subframe which is indicated as the downlink subframe by the first uplink reference UL-DL configuration. The terminal device 1 does not perform uplink transmission in the DwPTS and GP of the subframe which is indicated as the special subframe by the first uplink reference UL-DL configuration.

Next, the first downlink reference UL-DL configuration will be described.

The first downlink reference UL-DL configuration is at least used to specify the subframe which is capable or incapable of performing downlink transmission in the serving cell.

The terminal device 1 does not perform downlink transmission in the subframe which is indicated as the uplink subframe by the first downlink reference UL-DL configuration. The terminal device 1 does not perform downlink transmission in the UpPTS and GP of the subframe which is indicated as the special subframe by the first downlink reference UL-DL configuration.

The terminal device 1 which sets the first downlink reference UL-DL configuration on the basis of the first information may perform measurement using the downlink signal (for example, the measurement of the channel state information) in the DwPTS of the special subframe or the downlink subframe which is indicated by the first uplink reference UL-DL configuration or the first downlink reference UL-DL configuration.

Figure 15:
FIG. 15 is a diagram illustrating the relationship between a subframe which is indicated by the first uplink reference UL-DL configuration and a subframe which is indicated by the first downlink reference UL-DL configuration in this embodiment.

The base station device 3 determines the downlink reference UL-DL configuration from a configuration set (the setting of the set) which is limited on the basis of the first uplink reference UL-DL configuration. That is, the first downlink reference UL-DL configuration is an element in the configuration set which is limited on the basis of the first uplink reference UL-DL configuration. The configuration set which is limited on the basis of the first uplink reference UL-DL configuration includes uplink-downlink configurations satisfying the following conditions (a) to (c). FIG. 15 is a diagram illustrating the relationship between the subframe indicated by the first uplink reference UL-DL configuration and the subframe indicated by the first downlink reference UL-DL configuration in this embodiment. In FIG. 15, D indicates the downlink subframe, U indicates the uplink subframe, and S indicates the special subframe.

Condition (a): the subframe which is indicated as the downlink subframe by the first uplink reference UL-DL configuration is indicated as the downlink subframe.

Condition (b): the subframe which is indicated as the uplink subframe by the first uplink reference UL-DL configuration is indicated as the uplink subframe or the downlink subframe.

Condition (c): the subframe which is indicated as the special subframe by the first uplink reference UL-DL configuration is indicated as the downlink subframe or the special subframe.

Therefore, in the dynamic TDD, since the subframe which is indicated as the downlink subframe by the first uplink reference UL-DL configuration and the DwPTS of the special subframe are not used for uplink transmission, the terminal device 1 which sets the first downlink reference UL-DL configuration on the basis of the first information can appropriately perform measurement using the downlink signal.

In addition, the terminal device 1 which sets the first downlink reference UL-DL configuration on the basis of the second information may perform measurement (for example, the measurement of the channel state information) using the downlink signal in the DwPTS of the special subframe or the downlink subframe which is indicated by the first uplink reference UL-DL configuration.

The subframe which is indicated as the uplink subframe by the first uplink reference UL-DL configuration and is indicated as the downlink subframe by the first downlink reference UL-DL configuration is also referred to as a first flexible subframe. The first flexible subframe is a subframe which is reserved for uplink and downlink transmission.

The subframe which is indicated as the special subframe by the first uplink reference UL-DL configuration and is indicated as the downlink subframe by the first downlink reference UL-DL configuration is also referred to as a second flexible subframe. The second flexible subframe is a subframe which is reserved for downlink transmission. The second flexible subframe is a subframe which is reserved for downlink transmission in the DwPTS and uplink transmission in the UpPTS.

Next, the transmission direction UL-DL configuration will be described in detail.

The terminal device 1 and the base station device 3 set the transmission direction UL-DL configuration for the transmission direction (downward/upward) in the subframe. The transmission direction UL-DL configuration is used to determine the transmission direction in the subframe.

The terminal device 1 controls transmission in the first flexible subframe and the second flexible subframe, on the basis of the scheduling information (the DCI format and/or the HARQ-ACK) and the transmission direction UL-DL configuration.

The base station device 3 transmits the third information indicating the transmission direction UL-DL configuration to the terminal device 1. The third information is information indicating the subframe which can perform uplink transmission. The third information is information indicating the subframe which can perform downlink transmission. The third information is information indicating the subframe which can perform uplink transmission in the UpPTS and can perform downlink transmission in the DwPTS.

For example, the transmission direction UL-DL configuration is used to specify the transmission direction in the subframe which is indicated as the uplink subframe by the first uplink reference UL-DL configuration and is indicated as the downlink subframe by the first downlink reference UL-DL configuration and/or the subframe which is indicated as the special subframe by the first uplink reference UL-DL configuration and is indicated as the downlink subframe by the first downlink reference UL-DL configuration. That is, the transmission direction UL-DL configuration is used to specify the transmission direction in the subframes which are indicated as different subframes by the first uplink reference UL-DL configuration and the first downlink reference UL-DL configuration.

FIG. 16 is a diagram illustrating the relationship between the subframe which is indicated by the first uplink reference UL-DL configuration, the subframe which is indicated by the first downlink reference UL-DL configuration, and the subframe which is indicated by the transmission direction UL-DL configuration in this embodiment. In FIG. 16, D indicates the downlink subframe, U indicates the uplink subframe, and S indicates the special subframe.

The base station device 3 determines the transmission direction UL-DL configuration from a configuration set (the setting of the set) which is limited on the basis of the first uplink reference UL-DL configuration and the first downlink reference UL-DL configuration. That is, the transmission direction UL-DL configuration is an element in the configuration set which is limited on the basis of the first uplink reference UL-DL configuration and the first downlink reference UL-DL configuration. The configuration set which is limited on the basis of the first uplink reference UL-DL configuration and the first downlink reference UL-DL configuration includes uplink-downlink configurations satisfying the following conditions (d) to (h).

Condition (d): the subframe which is indicated as the downlink subframe by the first uplink reference UL-DL configuration and the first downlink reference UL-DL configuration is indicated as the downlink subframe.

Condition (e): the subframe which is indicated as the uplink subframe by the first uplink reference UL-DL configuration and the first downlink reference UL-DL configuration is indicated as the uplink subframe.

Condition (f): the subframe which is indicated as the uplink subframe by the first uplink reference UL-DL configuration and is indicated as the downlink subframe by the first downlink reference UL-DL configuration is indicated as the uplink subframe or the downlink subframe.

Condition (g): the subframe which is indicated as the special subframe by the first uplink reference UL-DL configuration and the first downlink reference UL-DL configuration is indicated as the special subframe.

Condition (h): the subframe which is indicated as the special subframe by the first uplink reference UL-DL configuration and is indicated as the downlink subframe by the first downlink reference UL-DL configuration is indicated as the special subframe or the downlink subframe.

The base station device 3 may schedule downlink transmission in the subframe which is indicated as the downlink subframe by the transmission direction UL-DL configuration.

The terminal device 1 may performs a downlink signal receiving process in the subframe which is indicated as the downlink subframe by the transmission direction UL-DL configuration. The terminal device 1 may monitor the PDCCH/EPDCCH in the subframe which is indicated as the downlink subframe by the transmission direction UL-DL configuration. The terminal device 1 may perform a PDSCH receiving process in the subframe which is indicated as the downlink subframe by the transmission direction UL-DL configuration, on the basis of the detection of the downlink grant through the PDCCH/EPDCCH.

In a case that the transmission of the uplink signal (PUSCH/SRS) in the subframe which is indicated as the downlink subframe by the transmission direction UL-DL configuration is scheduled or set, the terminal device 1 may not perform an uplink signal (PUSCH/SRS) transmitting process in the subframe.

The base station device 3 may schedule uplink transmission in the subframe which is indicated as the uplink subframe by the transmission direction UL-DL configuration.

The base station device 3 may schedule downlink transmission in the subframe which is indicated as the uplink subframe by the transmission direction UL-DL configuration. The scheduling of the downlink transmission by the base station device 3 may be prohibited in the subframe which is indicated as the uplink subframe by the transmission direction UL-DL configuration.

The terminal device 1 may perform an uplink signal transmitting process in the subframe which is indicated as the uplink subframe by the transmission direction UL-DL configuration. In a case that the transmission of the uplink signal (PUSCH/DMRS/SRS) in the subframe which is indicated as the uplink subframe by the transmission direction UL-DL configuration is scheduled or set, the terminal device 1 may perform the uplink signal (PUSCH/DMRS/SRS) transmitting process in the subframe.

The terminal device 1 may perform the downlink signal receiving process in the subframe which is indicated as the uplink subframe by the transmission direction UL-DL configuration and in which uplink transmission is not scheduled. The downlink signal receiving process of the terminal device 1 may be prohibited in the subframe which is indicated as the uplink subframe by the transmission direction UL-DL configuration.

The base station device 3 may schedule downlink transmission in the DwPTS of the subframe which is indicated as the special subframe by the transmission direction UL-DL configuration.

The terminal device 1 may perform the downlink signal receiving process in the DwPTS of the subframe which is indicated as the special subframe by the transmission direction UL-DL configuration. The terminal device 1 may monitor the PDCCH/EPDCCH in the DwPTS of the subframe which is indicated as the special subframe by the transmission direction UL-DL configuration. The terminal device 1 may perform the PDSCH receiving process in the DwPTS of the subframe which is indicated as the special subframe by the transmission direction UL-DL configuration, on the basis of the detection of the downlink grant through the PDCCH/EPDCCH.

In a case that the transmission of the PUSCH in the subframe which is indicated as the special subframe by the transmission direction UL-DL configuration is scheduled or set, the terminal device 1 does not perform a PUSCH transmitting process in the subframe.

In a case that the transmission of the SRS in the UpPTS of the subframe which is indicated as the special subframe by the transmission direction UL-DL configuration is scheduled or set, the terminal device 1 may perform an SRS transmitting process in the UpPTS of the subframe.

In the first flexible subframe indicated as the downlink subframe by the transmission direction UL-DL configuration, the CRS, PDCCH, PHICH, and/or PCFICH may not be transmitted. In this case, in the first flexible subframe used as the downlink subframe, the EPDCCH and PDSCH are transmitted.

In the first flexible subframe indicated as the downlink subframe by the transmission direction UL-DL configuration, the base station device 3 may control whether to transmit the CRS, PDCCH, PHICH, and/or PCFICH. In this case, the base station device 3 transmits a CRS parameter indicating whether or not CRS, PDCCH, PHICH and/or PCFICH is transmitted in the first flexible subframe indicated as the downlink subframe by the transmission direction UL-DL configuration to the terminal device 1, and the terminal device 1 sets the CRS parameter.

In the GP and UpPTS fields of the second flexible subframe indicated as the downlink subframe by the transmission direction UL-DL configuration, the CRS may not be transmitted. In the second flexible subframe indicated as the downlink subframe by the transmission direction UL-DL configuration, the base station device 3 may control whether or not to transmit the CRS. In this case, the terminal device 1 may determine whether or not the CRS is transmitted in the GP and UpPTS fields of the second flexible subframe indicated as the downlink subframe by the transmission direction UL-DL configuration on the basis of the CRS parameter.

FIG. 17 is a diagram illustrating the relationship between the first uplink reference UL-DL configuration, the first downlink reference UL-DL configuration, and the transmission direction UL-DL configuration in this embodiment.

For example, in FIG. 17, in a case that the first uplink reference UL-DL configuration is 0, the first downlink reference UL-DL configuration is one of a set {0, 1, 2, 3, 4, 5, 6}. For example, in FIG. 17, in a case that the first uplink reference UL-DL configuration is 1, the first downlink reference UL-DL configuration is one of a set {1, 2, 4, 5}.

For example, in FIG. 17, in a case that the first uplink reference UL-DL configuration is 0 and the first downlink reference UL-DL configuration is 1, the transmission direction UL-DL configuration is one of a set {0, 1, 6}.

The value of the first downlink reference UL-DL configuration may be equal to the value of the first uplink reference UL-DL configuration. However, the terminal device 1 which does not receive the second information sets the same value as the value of the first uplink reference UL-DL configuration to the first downlink reference UL-DL configuration. Therefore, preferably, the value of the first downlink reference UL-DL configuration indicated by the second information is not equal to the value of the first uplink reference UL-DL configuration indicated by the first information.

In a case that the value of the first uplink reference UL-DL configuration is equal to the value of the first downlink reference UL-DL configuration, the transmission direction UL-DL configuration may not be defined. Alternatively, in a case that the value of the first uplink reference UL-DL configuration is equal to the value of the first downlink reference UL-DL configuration, the same value as the value of the first uplink reference UL-DL configuration and the value of the first downlink reference UL-DL configuration may be set to the transmission direction UL-DL configuration.

The third information may be information indicating the transmission direction UL-DL configuration in the configuration set (the setting of the set) including the first uplink reference UL-DL configuration and the first downlink reference UL-DL configuration.

Next, the first uplink reference UL-DL configuration and the second uplink reference UL-DL configuration will be described in detail.

The first uplink reference UL-DL configuration and the second uplink reference UL-DL configuration are used to specify (select or determine) the correspondence between the subframe n in which a PDCCH/EPDCCH/PHICH is arranged and the subframe n+k in which a PUSCH corresponding to the PDCCH/EPDCCH/PHICH is arranged.

In a case that one primary cell is set or in a case that one primary cell and one secondary cell are set and the first uplink reference UL-DL configuration for the primary cell is the same as the first uplink reference UL-DL configuration for the secondary cell, the corresponding first uplink reference UL-DL configuration is used to determine the correspondence between a subframe in which a PDCCH/EPDCCH/PHICH is arranged and a subframe in which a PUSCH corresponding to the PDCCH/EPDCCH/PHICH is arranged, in each of the two serving cells.

In a case that one primary cell and one secondary cell are set and the first uplink reference UL-DL configuration for the primary cell is different from the first uplink reference UL-DL configuration for the secondary cell, the corresponding second uplink reference UL-DL configuration is used to determine the correspondence between a subframe in which a PDCCH/EPDCCH/PHICH is arranged and a subframe in which a PUSCH corresponding to the PDCCH/EPDCCH/PHICH is arranged, in each of the two serving cells.

FIG. 18 is a diagram illustrating the correspondence between a subframe n in which a PDCCH/EPDCCH/PHICH is arranged and a subframe n+k in which a PUSCH corresponding to the PDCCH/EPDCCH/PHICH is arranged in this embodiment. The terminal device 1 specifies (selects or determines) the value of k according to the table shown in FIG. 18.

In FIG. 18, in a case that one primary cell is set or in a case that one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 18, in a case that one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 18, the first uplink reference UL-DL configuration and the second uplink reference UL-DL configuration are simply referred to as an uplink-downlink configuration.

In a case that the PDCCH/EPDCCH with the uplink grant, which corresponds to the serving cells to which uplink-downlink configurations 1 to 6 are set and is for the terminal device 1, is detected in the subframe n, the terminal device 1 performs PUSCH transmission corresponding to the uplink grant in the subframe n+k which is specified (selected or determined) on the basis of the table shown in FIG. 18.

In a case that the PHICH with the NACK, which corresponds to the serving cells to which the uplink-downlink configurations 1 to 6 are set and is for the terminal device 1, is detected in the subframe n, the terminal device 1 performs PUSCH transmission in the subframe n+k which is specified (selected or determined) on the basis of the table shown in FIG. 18.

The uplink grant, which corresponds to the serving cell to which the uplink-downlink configuration 0 is set and is for the terminal device 1, includes a 2-bit uplink index (UL index). The uplink grant, which corresponds to the serving cells to which the uplink-downlink configurations 1 to 6 are set and is for the terminal device 1, does not include the uplink index (UL index).

In a case that the most significant bit (MSB) of the uplink index included in the uplink grant corresponding to the serving cell to which the uplink-downlink configuration 0 is set is set to 1 in the subframe n, the terminal device 1 adjusts PUSCH transmission corresponding to the uplink grant in the subframe n+k which is specified (selected or determined) on the basis of the table shown in FIG. 18.

In a case that the PHICH with the NACK corresponding to the serving cell to which the uplink-downlink configuration 0 is set is received in a first resource set of the subframe n=0 or 5, the terminal device 1 adjusts PUSCH transmission corresponding to the PHICH in the subframe n+k which is specified (selected or determined) on the basis of the table shown in FIG. 18.

In a case that the least significant bit (LSB) of the uplink index included in the uplink grant corresponding to the serving cell to which the uplink-downlink configuration 0 is set is set to 1 in the subframe n, the terminal device 1 adjusts PUSCH transmission corresponding to the uplink grant in a subframe n+7.

In a case that the PHICH with the NACK corresponding to the serving cell to which the uplink-downlink configuration 0 is set is received in a second resource set of the subframe n=0 or 5, the terminal device 1 adjusts PUSCH transmission corresponding to the uplink grant in the subframe n+7.

In a case that the PHICH with the NACK corresponding to the serving cell to which the uplink-downlink configuration 0 is set is received in the subframe n=1 or 6, the terminal device 1, the terminal device 1 adjusts PUSCH transmission corresponding to the uplink grant in the subframe n+7.

For example, in a case that the PDCCH/EPDCCH/PHICH corresponding to the serving cell to which the uplink-downlink configuration 0 is set is detected in [SFN=m, subframe 1], the terminal device 1 adjusts PUSCH transmission in [SFN=m, subframe 7] which is six subframes after the subframe 1.

The first uplink reference UL-DL configuration and the second uplink reference UL-DL configuration are used to specify (select or determine) the correspondence between the subframe n in which a PHICH is arranged and the subframe n−k in which a PUSCH corresponding to the PHICH is arranged.

In a case that one primary cell is set or in a case that one primary cell and one secondary cell are set and the first uplink reference UL-DL configuration for the primary cell is the same as the first uplink reference UL-DL configuration for the secondary cell, the corresponding first uplink reference UL-DL configuration is used to specify (select or determine) the correspondence between the subframe n in which a PHICH is arranged and the subframe n−k in which a PUSCH corresponding to the PHICH is arranged, in each of the two serving cells.

In a case that one primary cell and one secondary cell are set and the first uplink reference UL-DL configuration for the primary cell is different from the first uplink reference UL-DL configuration for the secondary cell, the corresponding second uplink reference UL-DL configuration is used to specify (select or determine) the correspondence between the subframe n in which a PHICH is arranged and the subframe n−k in which a PUSCH corresponding to the PHICH is arranged, in each of the two serving cells.

FIG. 19 is a diagram illustrating the correspondence between the subframe n in which a PHICH is arranged and the subframe n−k in which a PUSCH corresponding to the PHICH is arranged in this embodiment. The terminal device 1 specifies (selects or determines) the value of k according to the table shown in FIG. 19.

In FIG. 19, in a case that one primary cell is set or in a case that one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 19, in a case that one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 19, the first uplink reference UL-DL configuration and the second uplink reference UL-DL configuration are simply referred to as an uplink-downlink configuration.

The HARQ indicator (HARQ-ACK), which is received through the PHICH corresponding to the serving cells to which the uplink-downlink configurations 1 to 6 are set in the subframe n, is related to the transmission of the PUSCH in the subframe n−k that is specified on the basis of the table shown in FIG. 19.

The HARQ indicator (HARQ-ACK), which is received through the PHICH corresponding to the serving cell to which the uplink-downlink configuration 0 is set in the first resource set of the subframe n=0 or 5 or the subframe n=1 or 6, is related to the transmission of the PUSCH in the subframe n−k that is specified on the basis of the table shown in FIG. 19.

The HARQ indicator (HARQ-ACK), which is received through the PHICH corresponding to the serving cell to which the uplink-downlink configuration 0 is set in the second resource set of the subframe n=0 or 5, is related to the transmission of the PUSCH in the subframe n−6.

For example, the HARQ indicator (HARQ-ACK), which is received through the PHICH corresponding to the serving cell to which the uplink-downlink configuration 1 is set in the [SFN=m, subframe 1], is related to the transmission of the PUSCH in [SFN=m−1, subframe 7] that is four subframes before the subframe 1.

The first uplink reference UL-DL configuration and the second uplink reference UL-DL configuration are used to specify (select or determine) the correspondence between the subframe n in which a PUSCH is arranged and the subframe n+k in which a PHICH corresponding to the PUSCH is arranged.

In a case that one primary cell is set or in a case that one primary cell and one secondary cell are set and the first uplink reference UL-DL configuration for the primary cell is the same as the first uplink reference UL-DL configuration for the secondary cell, the corresponding first uplink reference UL-DL configuration is used to specify (select or determine) the correspondence between the subframe n in which a PUSCH is arranged and the subframe n+k in which a PHICH corresponding to the PUSCH is arranged, in each of the two serving cells.

In a case that one primary cell and one secondary cell are set and the first uplink reference UL-DL configuration for the primary cell is different from the first uplink reference UL-DL configuration for the secondary cell, the corresponding second uplink reference UL-DL configuration is used to specify (select or determine) the correspondence between the subframe n in which a PUSCH is arranged and the subframe n+k in which a PHICH corresponding to the PUSCH is arranged, in each of the two serving cells.

FIG. 20 is a diagram illustrating the correspondence between the subframe n in which a PUSCH is arranged and the subframe n+k in which a PHICH corresponding to the PUSCH is arranged in this embodiment. The terminal device 1 specifies (selects or determines) the value of k according to the table shown in FIG. 20.

In FIG. 20, in a case that one primary cell is set or in a case that one primary cell and one secondary cell are set and the first uplink reference UL-DL configuration for the primary cell is the same as the first uplink reference UL-DL configuration for the secondary cell, the uplink-downlink configuration refers to the first uplink reference UL-DL configuration.

In FIG. 20, in a case that one primary cell and one secondary cell are set and the first uplink reference UL-DL configuration for the primary cell is different from the first uplink reference UL-DL configuration for the secondary cell, the uplink-downlink configuration refers to the second uplink reference UL-DL configuration.

Hereinafter, in the description of FIG. 20, the first uplink reference UL-DL configuration and the second uplink reference UL-DL configuration are simply referred to as an uplink-downlink configuration.

In a case that the transmission of the PUSCH is scheduled in the subframe n, the terminal device 1 determines a PHICH resource in the subframe n+k that is specified on the basis of the table shown in FIG. 20.

For example, in a case that the transmission of the PUSCH corresponding to the serving cell to which the uplink-downlink configuration 0 is set is scheduled in [SFN=m, subframe n=2], the PHICH resource is determined in [SFN=m, subframe n=6].

Next, the first downlink reference UL-DL configuration and the second downlink reference UL-DL configuration will be described in detail.

The first downlink reference UL-DL configuration and the second downlink reference UL-DL configuration are used to specify (select or determine) the correspondence between the subframe n in which a PDSCH is arranged and the subframe n+k in which an HARQ-ACK corresponding to the PDSCH is transmitted.

In a case that one primary cell is set or in a case that one primary cell and one secondary cell are set and the first downlink reference UL-DL configuration for the primary cell is the same as the first downlink reference UL-DL configuration for the secondary cell, the corresponding first downlink reference UL-DL configuration is used to specify (select or determine) the correspondence between the subframe n in which a PDSCH is arranged and the subframe n+k in which a HARQ-ACK corresponding to the PDSCH is transmitted, in each of the two serving cells.

In a case that one primary cell and one secondary cell are set and the first uplink reference UL-DL configuration for the primary cell and the first downlink reference UL-DL configuration for the secondary cell are different, the corresponding second downlink reference UL-DL configuration is used to specify (select or determine) of the correspondence between the subframe n in which a PDSCH is arranged and the subframe n+k in which a HARQ-ACK corresponding to the PDSCH is transmitted in each of the two serving cells.

FIG. 21 is a diagram illustrating the correspondence between the subframe n−k in which a PDSCH is arranged and the subframe n in which an HARQ-ACK corresponding to the PDSCH is transmitted in this embodiment. The terminal device 1 specifies (selects or determines) the value of k according to the table shown in FIG. 21.

In FIG. 21, in a case that one primary cell is set or in a case that one primary cell and one secondary cell are set and the first downlink reference UL-DL configuration for the primary cell is the same as the first downlink reference UL-DL configuration for the secondary cell, the uplink-downlink configuration refers to the first downlink reference UL-DL configuration.

In FIG. 21, in a case that one primary cell and one secondary cell are set and the first downlink reference UL-DL configuration for the primary cell is different from the first downlink reference UL-DL configuration for the secondary cell, the uplink-downlink configuration refers to the second downlink reference UL-DL configuration.

Hereinafter, in the description of FIG. 21, the first downlink reference UL-DL configuration and the second downlink reference UL-DL configuration are simply referred to as an uplink-downlink configuration.

In a case that the transmission of the PDSCH which transmits the corresponding HARQ-ACK and is for the terminal device 1 in the subframe n−k (k is specified by the table shown in FIG. 21) of the serving cell is detected, the terminal device 1 transmits the HARQ-ACK in the subframe n.

For example, the terminal device 1 does not perform the response of the HARQ-ACK for the transmission of the PDSCH used to transmit the system information. For example, the terminal device 1 performs the response of the HARQ-ACK for the transmission of the PDSCH scheduled by the DCI format with the CRC scrambled with the C-RNTI.

For example, the terminal device 1 transmits the HARQ-ACK for the PDSCH received in the subframe n−6 and/or n−7 in the serving cell to which the uplink-downlink configuration 1 is set in the subframe n=2.

The first downlink reference UL-DL configuration may not be set to the serving cell which does not receive the second information. In this case, the terminal device 1 and the base station device 3 may perform the process based on the first downlink reference UL-DL configuration, on the basis of the first uplink reference UL-DL configuration (serving cell UL-DL configuration). The serving cell which does not receive the second information is a serving cell to which the dynamic TDD is not set.

For example, in a case that one primary cell and one secondary cell are set, the second information on the primary cell is not received, the second information on the secondary cell is received, the first uplink reference UL-DL configuration (serving cell UL-DL configuration) for the primary cell is different from the first downlink reference UL-DL configuration for the secondary cell, and the serving cell is the secondary cell, the second downlink reference UL-DL configuration for the serving cell (secondary cell) may be set on the basis of a pair which is formed by the first uplink reference UL-DL configuration for the other serving cell (primary cell) and the first downlink reference UL-DL configuration for the serving cell (secondary cell).

For example, in a case that one primary cell and one secondary cell are set, the second information on the primary cell is not received, the second information on the secondary cell is received, and the first uplink reference UL-DL configuration (serving cell UL-DL configuration) for the primary cell is different from the first downlink reference UL-DL configuration for the secondary cell, the corresponding second downlink reference UL-DL configuration may be used to specify (select or determine) the correspondence between the subframe n in which a PDSCH is arranged and the subframe n+k in which an HARQ-ACK corresponding to the PDSCH is transmitted, in each of the two serving cells.

For example, in a case that one primary cell and one secondary cell are set, the second information on the primary cell is not received, the second information on the secondary cell is received, and the first uplink reference UL-DL configuration (serving cell UL-DL configuration) for the primary cell is the same as the first downlink reference UL-DL configuration for the secondary cell, the corresponding first uplink reference UL-DL configuration (serving cell UL-DL configuration) may be used to specify (select or determine) the correspondence between the subframe n in which a PDSCH is arranged and the subframe n+k in which a HARQ-ACK corresponding to the PDSCH is transmitted in the primary cell and the corresponding first downlink reference UL-DL configuration may be used to specify (select or determine) the correspondence between the subframe n in which a PDSCH is arranged and the subframe n+k in which an HARQ-ACK corresponding to the PDSCH is transmitted in the secondary cell.

For example, in a case that one primary cell and one secondary cell are set, the second information on the primary cell is not received, the second information on the secondary cell is received, and the first uplink reference UL-DL configuration (serving cell UL-DL configuration) for the primary cell is different from the first downlink reference UL-DL configuration for the secondary cell, the primary cell UL-DL configuration refers to the first uplink reference UL-DL configuration for the primary cell, in FIGS. 12 and 14.

Hereinafter, the CSI will be described in detail.

The CSI includes a channel quality indicator (CQI), a rank indicator (RI), and a precoding matrix indicator (PMI). The CQI represents a combination of a modulation method and a coding rate for a single transport block transmitted on the PDSCH. The coding rate is derived from a PDSCH resource amount and a transport block size.

FIG. 22 is a table representing a coding rate and a modulation method corresponding to the CQI index in this embodiment. The terminal device 1 derives a highest CQI index from 1 to 15 of the table shown in FIG. 22 which satisfies a condition where a single PDSCH transport block which is transmitted in a group of downlink physical resource blocks called CSI reference resources and is a combination of a transport block size and a modulation method corresponding to a CQI index may be received with a transport block error probability of equal to or less than 0.1. In a case that a CQI index 1 does not satisfy the aforementioned condition, the terminal device 1 derives a CQI index 0.

However, in a case that the UL-DL configurations of the adjacent cell and the serving cell are different, interference states are different for each subframe. In this embodiment, at least two subframe sets are defined, and the terminal device 1 reports the channel state information for each of at least two subframe sets to the base station device 3. The subframe set is preferably configured based on the interference state of the subframe.

Figure 23:
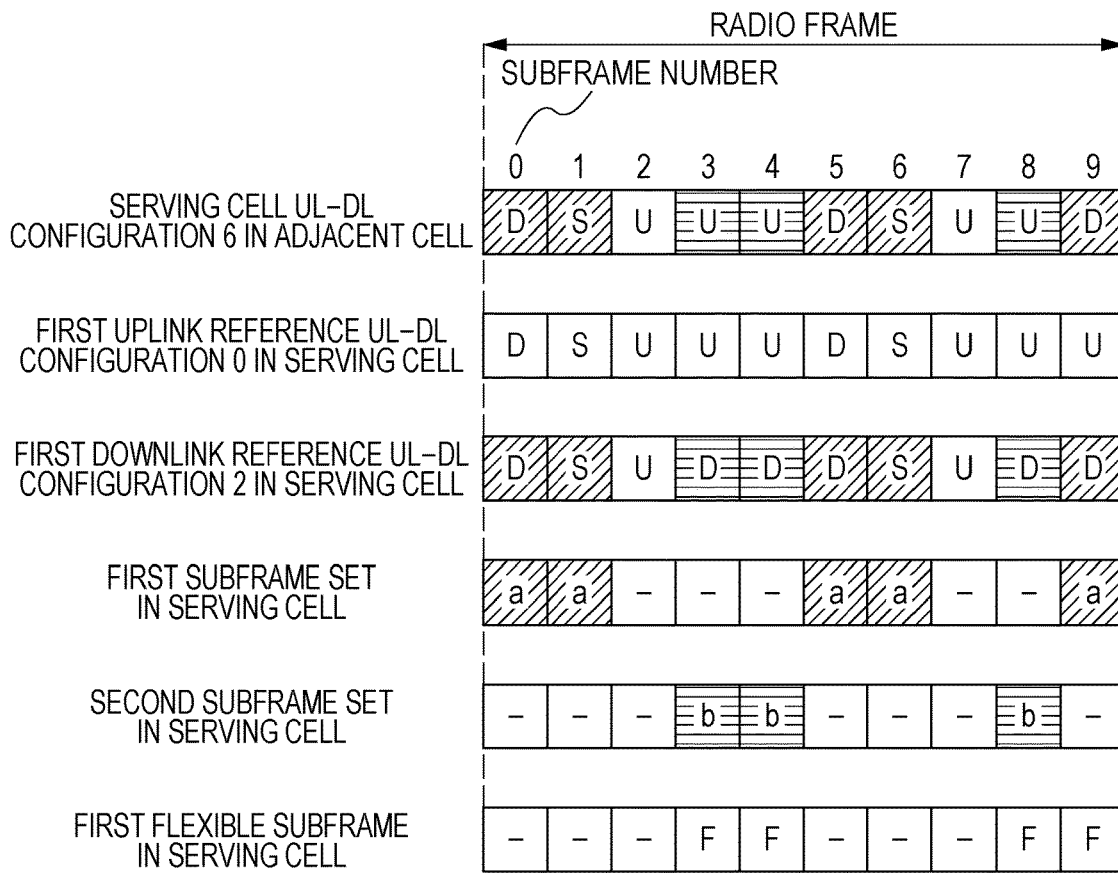
FIG. 23 is a diagram showing an example of the structure of a subframe set in this embodiment.

FIG. 23 is a diagram illustrating an example of the structure of the subframe set in this embodiment. In FIG. 23, D indicates a downlink subframe, U indicates an uplink subframe, S indicates a special subframe, a indicates a subframe belonging to a first subframe set, b indicates a subframe belonging to a second subframe set, and F indicates a first flexible subframe.

In FIG. 23, the downlink transmission is performed in subframes {0, 1, 3, 4, 5, 6, 8, 9} of the serving cell. In FIG. 23, the downlink transmission is performed in subframes {0, 1, 5, 6, 9} of the adjacent cell, and the uplink transmission is performed in subframes {3, 4, 8} of the adjacent cell. Accordingly, in the serving cell, an interference state is different between the subframes {0, 1, 5, 6, 9} and the subframes {3, 4, 8}. In FIG. 23, the first subframe set includes the subframes {0, 1, 5, 6, 9}, and the second subframe set includes the subframes {3, 4, 8}.

The base station device 3 may transmit information indicating the subframe set to the terminal device 1, and the terminal device 1 may set the subframe set on the basis of the information.

The subframe set may be implicitly configured based on the first flexible subframe. For example, the first subframe set may include the first flexible subframe, and the second subframe set may include the subframe indicated as the downlink subframe or the special subframe by the first uplink reference UL-DL configuration.

Multiple CSI processes may be configured to the terminal device 1. At least two subframe sets may be configured for a single CSI process. At least two CSI processes may be configured to the terminal device 1, and one subframe set may be configured for each of at least two CSI processes.

The terminal device 1 may derive the CSI for each of the multiple CSI processes and/or each of the plurality of subframe sets, and may report the CSI.

The special subframe including a DwPTS having a length equal to or shorter than 7680/(15000×2048) seconds may not belong to any subframe set.

The report of the CSI is periodic, or aperiodic. A CSI that is periodically reported is referred to as a periodic CSI. A CSI that is aperidocally reported is referred to as an aperiodic CSI.

A resource used to report the CSI by the terminal device 1 is controlled by the base station device 3.

The terminal device 1 is semi-statically configured by the higher layer (RRC layer) such that the CSI is periodically fed back through the PUSCH. That is, the terminal device 1 set a subframe that reports the periodic CSI by the higher layer (RRC layer). The terminal device 1 may set the periodic CSI report for each CSI process and/or each subframe set.

The aperiodic CSI is transmitted on the PUSCH. The terminal device 1 detects the uplink grant in the subframe n for the serving cell c, and reports the aperiodic CSI by using the PUSCH scheduled by the uplink grant in the subframe n+k of the serving cell c in a case that the CSI request field included in the uplink grant is set to trigger the CSI report.

Information (CSI request) indicating whether to instruct the terminal device 1 to report the aperiodic CSI is mapped to the CSI request field. The information indicates the CSI process and/or the subframe set, and the terminal device 1 may report the aperiodic CSI for each CSI process and/or each subframe set indicated by the information.

The terminal device 1 derives a wide band CQI and a sub band CQI. In the frequency domain, the wide band CQI corresponds to all of the downlink physical resource blocks, and the sub band CQI corresponds to some of downlink physical resource blocks.

Hereinafter, the CSI reference resource will be described.

In the frequency domain, the CSI reference resource is defined by a group of downlink physical resource blocks corresponding to a band to which a value of the derived CQI is related.

In the time domain, the CSI reference resource is defined by one subframe. In a case that the CSI is reported in the subframe n, the CSI reference resource is defined by the subframe n-nCQIref.

For example, in a case that the CSI is reported in the subframe n, nCQIref is a smallest value that is equal to or greater than m such that the subframe n-nCQIref corresponds to a valid subframe. For example, m is 4 or 5. For example, in a case that the aperiodic CSI is reported, the CSI reference resource is a valid subframe that receives the corresponding CSI request.

Figure 24:
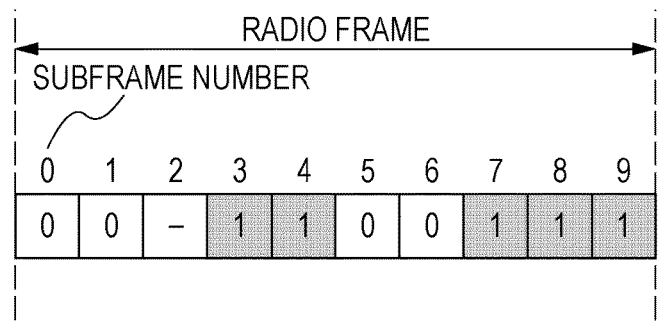
FIG. 24 is a diagram illustrating an example of the subframe set in this embodiment.

FIG. 24 illustrates an example of the subframe set. The subframe set includes, for example, at least two subframe set from the higher layer. In FIG. 24, the subframes {0, 1, 5, 6} are included in the subframe set 0, the subframes {3, 4, 7, 8, 9} are included in the subframe set 1. Of course, the number of subframes or included subframe number may be arbitrarily configured by information of the higher layer.

FIG. 25 illustrates an example of the CSI corresponding to the bit included in the CSI request filed. The bits "00" represents that the CSI report is not requested, and "01", "10" and "11" are set such that the CSI report corresponding to the CSIs of the first and/or the second subframe sets is triggered. For example, a value of the CSI request field being "01" means that the aperiodic CSI report corresponding to the CIS of the first subframe set is triggered, a value of the CSI request field being "10" means that the aperiodic CSI report corresponding to the CIS of the second subframe set is triggered, and the value of the CSI request field being "11" means that the aperiodic CSI report of the CSIs corresponding to both of the first and second subframe sets are triggered.

FIG. 26 shows an example of configuration of the correspondence between the bit value of the CSI request field and the subframe set by the higher layer. In this drawing, the first subframe set is configured as a subframe set #0, and the second subframe set is configured as a subframe set #1. The base station device 3 configures by using information of the higher layer (for example, the RRC layer), to the terminal device 1, the correspondence between the value of the CSI request field and the subframe set. The terminal device 1 performs the CSI report which is triggered based on the value of the CSI request field indicated using the control information (for example, DCI) and is for one corresponding subframe set or a plurality of corresponding subframe sets. That is, the terminal device 1 performs the CSI report for the one or plurality of subframe sets on the basis of the correspondence between the value of the CSI request field and the subframe set which is configured by the higher layer and the value of the CSI request field included in the control information (for example, DCI).

Similarly, for example, in a case that three subframe sets are configured, the CSI report of a set of the subframe sets is triggered by the value of the CSI request field.

For example, in a case that the correspondence between the value of the CSI request field and the set of the subframe sets is configured by the higher layer, the value of the CSI request field may be defined as shown in FIG. 27. In this case, in a case that the CSI request field is associated with the example of FIG. 26 as one example, the value of the CSI request field means that the first set of the subframe set includes only the subframe set #0, the second set of the subframe set includes only the subframe set #1, or the third set of the subframe set includes both of the subframe sets #0 and #1.

Next, an example of configuration by the higher layer in a case that the multiple CSI processes are configured will be described. That is, the aforementioned example of configuration by the higher layer may be an example of configuration by the higher layer in a case that a single CSI process is configured. FIG. 28 shows an example of a pair capable of configuration, and it will be described that the number of CSI processes is 2 and the number of subframe sets corresponding to the one CSI process is 2. As illustrated in this drawing, in a case that a condition where the report of CSIs of the plurality of subframe sets can be triggered is considered, there are six pairs in total, and, for example, three pairs are configured among these pairs by the higher layer. In the example of this drawing, in a case that the value of the CSI request field is '01', the CSI report of the subframe set #0 of the CSI process ID #1 is triggered. In a case that the value of the CSI request field is '10', the CSI report of the CSIs corresponding to the subframe sets #0 and #1 of the CSI process ID #1 is triggered. In a case that the value of the CSI request field is '11', the CSI report of CSIs corresponding to the subframe sets #0 and #1 of the CSI process ID #2 is triggered. The aforementioned description is merely an example, and a plurality of pairs may be configured.

FIG. 29 illustrates definition of the CSI request field of the control information (for example, DCI) transmitted on the PDCCH/EPDCCH in a case that multiple CSI processes are configured in the embodiment of the present invention. In the example of this drawing, the CSI report is not triggered in a case that the value of the CSI request field is '00', and the CSI report of the first set of the subframe set of the first CSI process is triggered in a case that the value of the CSI request field is '01'. Further, the CSI report of the second set of the subframe set of the second CSI process is triggered in a case that the value of the CSI request field is '10', and the CSI report of the third set of the subframe set of the third CSI process is triggered in a case that the value of the CSI request field is '11'. Of course, one or more CSI processes may be respectively included in each of the first, second and third value of CSI request field, and the plurality of subframe sets may be respectively included in each of the first, second and third subframes.

Next, another example of configuration by the higher layer in a case that multiple CSI processes are configured will be described. FIG. 30 shows an example of a pair capable of configuration, and it will be described that the number of CSI processes is 2 and the number of subframe sets for each CSI process is 2. In this drawing, since arbitrary CSI report is triggered for the CSI process ID and the subframe sets, three pairs for which the CSI reports is triggered are configured among the 15 pairs in total. In this drawing, for example, in a case that the value of the CSI request field is '01', the CSI report of CSIs of both subframe sets of CSI process ID #1 and both subframe sets of CSI process ID #2 is triggered. In a case that the value of the CSI request field is '10', the CSI report of CSIs subframe set #2 of CSI process ID #1 and subframe set #2 of CSI process ID #2 is triggered. In a case that the value of the CSI request field is '11', the CSI report of the subframe set #0-1 and the subframe set #1-1 is triggered.

The subframe set #0-1 and the subframe set #0-2 may be the same, or may be different. The subframe set #1-1 and the subframe set #1-2 may be the same, or may be different.

FIG. 31 shows an example of configuration of the value of the CSI request field in a case that the plurality of cells (for example, carrier application) are configured. In this drawing, in a case that the value of the CSI request field is '01', the CSI report for the primary cell is triggered or the CSI report for the secondary cell is triggered. Here, in a case that the CSI report is triggered by a certain value (for example, '01') of the CSI request field, a CSI report for any one of the primary cell and the secondary cell is determined depending on whether or not any serving cell in which a PUSCH is scheduled by the uplink grant including the CSI request field of the certain value is the primary cell or the secondary cell. For example, in a case that a serving cell in which a PUSCH is scheduled by the uplink grant including the CSI request field of the certain value is the secondary cell, '01' indicates that the CSI report of CSIs of the subframe sets #0-2 and #1-2 of the CSI process ID #1 for the secondary cell is triggered. For example, in a case that the serving cell in which the PUSCH is scheduled by the uplink grant including the CSI request field of the certain value is the primary cell, '01' indicates that the CSI report of CSIs of the subframe sets #0-2 and #1-2 of the CSI process ID #1 for the primary cell is triggered. The triggers of the CSI report are set to '10' and '11' as shown in FIG. 31 in the same manner as that in the aforementioned description. For example, in a case that the value of the CSI request field is '10', the CSI report of the CSIs of the subframe set #1-1 of the CSI process ID #1 for the primary cell and the subframe set #1-2 of the CSI process ID #1 for the secondary cell is triggered. It is possible to apply a cell in which the PUSCH is scheduled by the uplink grant including the CSI request field of the certain cell to a case where two or more secondary cells are set, as the serving cell.

FIG. 32 illustrates the relationship between the value of the CSI request field of FIG. 31 and the trigger of the CSI report. As described in FIG. 31, the value of the CSI request field configured by the higher layer (for example, RRC) is defined in the physical layer as shown in FIG. 32. The serving cell c of FIG. 32 is the serving cell in which the PUSCH is scheduled by the uplink grant including the CSI request field set such that the CSI report is triggered.

Although it has been described in the present invention that the CSI request field is two bits, the number of bits is not limited thereto. The pair depending on the number of bits may be defined. In a case that the CSI request field is one bit, '00' and '01' of two bits of CSI request field may correspond to '0' and '1' of one bit of CSI request field. One bit of CSI request field is preferably included in the uplink grant transmitted in the CSS. One or more bits of CSI request field may be included in the uplink grant transmitted in the USS. That is, in the aforementioned example of configuration, the terminal device 1 may be applied to only a case where the uplink grant transmitted in the USS is detected.

A case where there are the following conditions is included in the present invention. For example, in a case that a sum of the number (Nu) of CSIs which are triggered for a given serving cell but are not reported and the number (Ny) of CSIs which are newly triggered for the serving cell exceeds the number of CSIs (Nx) that can be simultaneously measured for the serving cell by the terminal device 1, the terminal device 1 may not update CSIs corresponding to CSI reference resources for subframe sets and all CSI processes that are newly triggered except for CSIs corresponding to subframe sets of low indexes and CSI processes of a max number (Nx−Nu, 0) of low indexes of CSIs that are newly triggered.

That is, in this case, the terminal device 1 determines whether to update CSIs corresponding to CSI reference resources for any subframe set and any CSI process on the basis of the index of the CSI process and the index of the subframe set.

In this case, a CSI corresponding to a subframe set of a low index of a CSI process of a given index has a higher priority than a CSI corresponding to a subframe set of a low index of a CSI process of the same index.

For example, in FIG. 30, in a case that the number (Nx) of the CSIs that can be simultaneously measured for a given serving cell by the terminal device 1 is 3, two CSIs corresponding to the subframe set #0-1 and the subframe set #1-1 for the serving cell are triggered but are not reported, and two CSI reports corresponding to the CSI reports of the subframe set #0-2 and the subframe set #1-2 for the serving cell are newly triggered, the terminal device 1 updates the CSI corresponding to the CSI reference resource for the subframe set #0-2, and does not update the CSI corresponding to the CSI reference resource for the subframe set #1-2.

The terminal device 1 may transmit information indicating the number (Nx) of CSIs that can be simultaneously measured in one serving cell to the base station device 3. The number (Nx) of CSIs that can be simultaneously measured in one serving cell may be defined in advance.

FIG. 33 shows an example where one subframe set is configured for one CSI process. Only one subframe set may be configured for one CSI process.

As described above, the terminal device 1 and the base station device 3 of the present invention have the following features.

(1) The terminal device 1 of this embodiment is the terminal device 1 communicating with the base station device 3. The terminal device includes: a reception unit that receives a downlink control information format that is used for scheduling of a physical uplink shared channel and includes request information used to indicate whether to request the transmission of the channel state information using the physical uplink shared channel to the terminal device, a higher layer signal including first information used to set at least two subframe sets for one CSI process, and the higher layer signal including second information used to set a correspondence between the two subframe sets for the one CSI process and a value to which a field of the request information is set; and a transmission unit that reports the channel state information corresponding to one subframe set or each of the plurality of subframe sets corresponding to the value of the request information by using the physical uplink shared channel in a case that the transmission of the channel state information is requested using the request information.

(2) In this embodiment, the channel state information corresponding to the subframe set includes a channel quality indicator derived based on interference measured using a resource corresponding to the subframe set.

(3) The terminal device 1 of this embodiment is the terminal device 1 communicating with the base station device 3. The terminal device includes: a reception unit that receives a downlink control information format that is used for scheduling of a physical uplink shared channel and includes request information used to indicate whether to request the transmission of the channel state information to the terminal device using the physical uplink shared channel, a higher layer signal including first information used to set one CSI process and the subframe set corresponding to the one CSI process, and the higher layer signal including second information used to set a correspondence between the subframe set corresponding to the one CSI process and a value to which a field of the request information is set; and a transmission unit that reports the channel state information corresponding to each of the subframe sets corresponding to the value of the request information by using the physical uplink shared channel in a case that the transmission of the channel state information is requested using the request information.

(4) In this embodiment, the base station device 3 includes a transmission unit that transmits a downlink control information format that is used for scheduling of a physical uplink shared channel and includes request information used to indicate whether to request the transmission of the channel state information using the physical uplink shared channel to the terminal device, a higher layer signal including first information used to set at least two subframe sets for one CSI process, and the higher layer signal including second information used to set a correspondence between the two subframe sets for the one CSI process and a value to which a field of the request information is set.

(5) The base station device 3 of this embodiment includes a reception unit that receives the channel state information corresponding to one subframe set or each of the plurality of subframe sets corresponding to the value of the request information by using the physical uplink shared channel in a case that the transmission of the channel state information is requested using the request information (the value is not "00").

(6) The base station device 3 of this embodiment includes the transmission unit that transmits a downlink control information format that is used for scheduling of a physical uplink shared channel and includes request information used to indicate whether to request the transmission of the channel state information to the terminal device using the physical uplink shared channel, a higher layer signal including first information used to set one CSI process and the subframe set corresponding to the one CSI process, and the higher layer signal including second information used to set a correspondence between the subframe set corresponding to the one CSI process and a value to which a field of the request information is set.

(7) The base station device 3 of this embodiment includes a reception unit that receives the channel state information corresponding to each of the subframe sets corresponding to the value of the request information by using the physical uplink shared channel in a case that the transmission of the channel state information is requested using the request information.

(8) The wireless communication method of this embodiment is the wireless communication method used in the terminal device 1 communicating with the base station device 3. The wireless communication method includes: causing receiving means to receive a downlink control information format that is used for scheduling of a physical uplink shared channel and includes request information used to indicate whether to request the transmission of the channel state information using the physical uplink shared channel to the terminal device, a higher layer signal including first information used to set at least two subframe sets for one CSI process, and the higher layer signal including second information used to set a correspondence between the two subframe sets for the one CSI process and a value to which a field of the request information is set; and causing transmitting means to report the channel state information corresponding to one subframe set or each of the plurality of subframe sets corresponding to the value of the request information by using the physical uplink shared channel in a case that the transmission of the channel state information is requested using the request information.

(9) In the wireless communication method of this embodiment, the channel state information corresponding to the subframe set includes a channel quality indicator derived based on interference measured using the resource corresponding to the subframe set.

(10) The wireless communication method of this embodiment is the wireless communication method used in the terminal device 1 communicating with the base station device 3. The wireless communication method includes: causing the receiving means to receive a downlink control information format that is used for scheduling of a physical uplink shared channel and includes request information used to indicate whether to request the transmission of the channel state information to the terminal device using the physical uplink shared channel, a higher layer signal including first information used to set one CSI process and the subframe set corresponding to the one CSI process, and the higher layer signal including second information used to set a correspondence between the subframe set corresponding to the one CSI process and a value to which a field of the request information is set; and causing transmitting means to report the channel state information corresponding to each of the subframe sets corresponding to the value of the request information by using the physical uplink shared channel in a case that the transmission of the channel state information is requested using the request information.

(11) The integrated circuit of this embodiment is the integrated circuit mounted in the terminal device communicating with the base station device. The integrated circuit causes the terminal device to exhibit a series of functions of receiving a downlink control information format that is used for scheduling of a physical uplink shared channel and includes request information used to indicate whether to request the transmission of the channel state information using the physical uplink shared channel to the terminal device, a higher layer signal including first information used to set at least two subframe sets for one CSI process, and the higher layer signal including second information used to set a correspondence between the two subframe sets for the one CSI process and a value to which a field of the request information is set, and reporting the channel state information corresponding to one subframe set or each of the plurality of subframe sets corresponding to the value of the request information by using the physical uplink shared channel in a case that the transmission of the channel state information is requested using the request information.

(12) In the integrated circuit of this embodiment, the channel state information corresponding to the subframe set includes a channel quality indicator derived based on interference measured using the resource corresponding to the subframe set.

(13) The integrated circuit of this embodiment is the integrated circuit mounted in the terminal device 1 communicating with the base station device 3. The integrated circuit causes the terminal device to exhibit a series of functions of receiving a downlink control information format that is used for scheduling of a physical uplink shared channel and includes request information used to indicate whether to request the transmission of the channel state information to the terminal device using the physical uplink shared channel, a higher layer signal including first information used to set one CSI process and the subframe set corresponding to the one CSI process, and the higher layer signal including second information used to set a correspondence between the subframe set corresponding to the one CSI process and a value to which a field of the request information is set; and reporting the channel state information corresponding to each of the subframe sets corresponding to the value of the request information by using the physical uplink shared channel in a case that the transmission of the channel state information is requested using the request information.

The program which runs on the base station device 3 and the terminal device 1 according to the invention may be a program (which causes a computer to function) which controls a central processing unit (CPU) such that the functions of the above-described embodiment of the invention are implemented. The information handled by these devices is temporarily stored in a random access memory (RAM) during the process and is then stored in various types of read only memories (ROMs), such as a flash ROM, or a hard disk drive (HDD). Then, the CPU reads, corrects, and writes the information, if necessary.

Some functions of the terminal device 1 and the base station device 3 according to the above-described embodiment may be implemented by a computer. In this case, a program for implementing the control function may be recorded on a computer-readable recording medium and a computer system may read the program recorded on the recording medium and execute the program to implement the functions.

The term "computer system" means a computer system that is provided with the terminal device 1 or the base station device 3 and includes an OS or hardware such as peripheral devices. The term "computer-readable recording medium" means a portable medium, such as a flexible disk, a magneto-optical disk, a ROM, or a CD-ROM, or a storing device, such as a hard disc provided in the computer system.

The "computer-readable recording medium" may include a recording medium that dynamically stores the program in a short time, such as a communication cable used in a case that the program is transmitted through a network, such as the Internet, or a communication line, such as a telephone line, and a recording medium that stores the program for a predetermined period of time, such as a volatile memory in a computer system that serves as a server or a client in this case. The "program" may be a program that implements some of the above-mentioned functions or a program that implements the above-mentioned functions in combination with the program which has been stored in the computer system.

The base station device 3 according to the above-described embodiment may be realized as an aggregate (device group) of a plurality of devices. Each of the devices forming the device group may have some or all of the functions or the functional blocks of the base station device 3 according to the above-described embodiment. The device group may have each function or each functional block of the base station device 3. The terminal device 1 according to the above-described embodiment can communicate with the base station device which is an aggregate of devices.

The base station device 3 according to the above-described embodiment may be an evolved universal terrestrial radio access network (EUTRAN). In addition, the base station device 3 according to the above-described embodiment may have some or all of the functions of a higher node of eNodeB.

Each of the terminal device 1 and the base station device 3 according to the above-described embodiments may be partly or entirely realized in the form of an LSI, which is a typical integrated circuit, or a chip set. Each functional block of the terminal device 1 and the base station device 3 may be individually integrated into a chip, or some or all of the functional blocks may be integrated into a chip. A method for achieving the integrated circuit is not limited to the LSI and it may be achieved by a dedicated circuit or a general-purpose processor. In addition, in a case that a technique for achieving an integrated circuit which replaces the LSI technique will be developed with the progress of a semiconductor technique, the integrated circuit manufactured by the developed technique can also be used.

In the above-described embodiment, the terminal device is given as an example of a terminal device or a communication device. However, the invention is not limited thereto. The invention can also be applied to terminal devices or communication devices of stationary or non-movable electronic apparatuses which are installed indoors or outdoors, such as AV apparatuses, kitchen devices, cleaning and washing machines, air conditioners, office devices, vending machines, and other home appliances.

The embodiment of the invention has been described above in detail with reference to the drawings. However, the detailed structure is not limited to the above-described embodiment and the invention also includes a change in the design within the scope and spirit of the invention. Various modifications and changes of the invention can be made without departing from the scope of the claims and the technical range of the invention includes embodiments obtained by appropriately combining technical means described in different embodiments. In addition, the elements which are described in each of the above-described embodiments and have the same effect may be replaced with each other.

REFERENCE SIGNS LIST

1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Subframe setting unit
1015 Scheduling information interpretation unit
1017 CSI reporting control unit
3011 Radio resource control unit
3013 Subframe setting unit
3015 Scheduling unit
3017 CSI reporting control unit

The invention claimed is:

1. A terminal device that communicates with a base station device, the terminal device comprising:
   a receiving circuitry configured to or configured and programmed to:
   receive downlink control information including first information used to trigger a report of channel state information using a physical uplink shared channel, the downlink control information being used for scheduling of the physical uplink shared channel;
   receive higher layer information including second information used to indicate two subframe sets for a single downlink component carrier; and
   receive higher layer information including third information, wherein
   the third information is used to indicate for which subframe set of the two subframe sets the report of the channel state information is triggered in a case that the report of the channel state information is triggered by a first value of a field of the first information,
   the third information is used to indicate for which subframe set of the two subframe sets the report of the channel state information is triggered in a case that the report of the channel state information is triggered by a second value of the field of the first information, and
   the third information is used to indicate for which subframe set of the two subframe sets the report of the channel state information is triggered in a case that the report of the channel state information is triggered by a third value of the field of the first information.

2. The terminal device according to claim 1, wherein the receiving circuitry is configured to or configured and programmed to receive higher layer information including fourth information,
   the fourth information is used to indicate whether or not the report of the channel state information for a channel state information process is triggered by the first value of the field of the first information,
   the fourth information is used to indicate whether or not the report of the channel state information for the channel state information process is triggered by the second value of the field of the first information, and
   the fourth information is used to indicate whether or not the report of the channel state information for the channel state information process is triggered by the third value of the field of the first information.

3. The terminal device according to claim 2, further comprising:
   a transmitting circuitry configured to or configured and programmed to report, using the physical uplink shared channel, the channel state information corresponding to a pair of a subframe set of the two subframe sets and the channel state information process in a case that the report of the channel state information is triggered by the first value of the field of the first information, the pair of the subframe set of the two subframe sets and the channel state information process being configured by using the third information and the fourth information, wherein
   the transmitting circuitry is configured to or configured and programmed to report, using the physical uplink shared channel, the channel state information corresponding to a pair of a subframe set of the two subframe sets and the channel state information process in a case that the report of the channel state information is triggered by the second value of the field of the first information, the pair of the subframe set of the two subframe sets and the channel state information process being configured by using the third information and the fourth information, and
   the transmitting circuitry is configured to or configured and programmed to report, using the physical uplink shared channel, the channel state information corresponding to a pair of a subframe set of the two subframe sets and the channel state information process in a case that the report of the channel state information is triggered by the third value of the field of the first information, the pair of the subframe set of the two subframe sets and the channel state information process being configured by using the third information and the fourth information.

4. A base station device that communicates with a terminal device, the base station device comprising:
a transmitting circuitry configured to or configured and programmed to:
   transmit downlink control information including first information used to
   trigger a report of channel state information using a physical uplink shared channel, the downlink control information being used for scheduling of the physical uplink shared channel;
   transmit higher layer information including second information used to indicate two subframe sets for a single downlink component carrier; and
   transmit higher layer information including third information, wherein
the third information is used to indicate for which subframe set of the two subframe sets the report of the channel state information is triggered in a case that the report of the channel state information is triggered by a first value of a field of the first information,
the third information is used to indicate for which subframe set of the two subframe sets the report of the channel state information is triggered in a case that the report of the channel state information is triggered by a second value of the field of the first information, and
the third information is used to indicate for which subframe set of the two subframe sets the report of the channel state information is triggered in a case that the report of the channel state information is triggered by a third value of the field of the first information.

5. The base station device according to claim 4, wherein
the transmitting circuitry is configured to or configured and programmed to transmit higher layer information including fourth information,
the fourth information is used to indicate whether or not the report of the channel state information for a channel state information process is triggered by the first value of the field of the first information,
the fourth information is used to indicate whether or not the report of the channel state information for the channel state information process is triggered by the second value of the field of the first information, and
the fourth information is used to indicate whether or not the report of the channel state information for the channel state information process is triggered by the third value of the field of the first information.

6. The base station device according to claim 5, further comprising:
a receiving circuitry configured to or configured and programmed to receive, using the physical uplink shared channel, the channel state information corresponding to a pair of a subframe set of the two subframe sets and the channel state information process in a case that the report of the channel state information is triggered by the first value of the field of the first information, the pair of the subframe set of the two subframe sets and the channel state information process being configured by using the third information and the fourth information, wherein the receiving circuitry is configured to or configured and programmed to receive, using the physical uplink shared channel, the channel state information corresponding to a pair of a subframe set of the two subframe sets and the channel state information process in a case that the report of the channel state information is triggered by the second value of the field of the first information, the pair of the subframe set of the two subframe sets and the channel state information process being configured by using the third information and the fourth information, and
the receiving circuitry is configured to or configured and programmed to receive, using the physical uplink shared channel, the channel state information corresponding to a pair of a subframe set of the two subframe sets and the channel state information process in a case that the report of the channel state information is triggered by the third value of the field of the first information, the pair of the subframe set of the two subframe sets and the channel state information process being configured by using the third information and the fourth information.

7. A communication method of a terminal device that communicates with a base station device, the communication method comprising:
receiving downlink control information including first information used to trigger a report of channel state information using a physical uplink shared channel, the downlink control information being used for scheduling of the physical uplink shared channel,
receiving higher layer information including second information used to indicate two subframe sets for a single downlink component carrier, and
receiving higher layer information including third information, wherein
the third information is used to indicate for which subframe set of the two subframe sets the report of the channel state information is triggered in a case that the report of the channel state information is triggered by a first value of a field of the first information,
the third information is used to indicate for which subframe set of the two subframe sets the report of the channel state information is triggered in a case that the report of the channel state information is triggered by a second value of the field of the first information, and
the third information is used to indicate for which subframe set of the two subframe sets the report of the channel state information is triggered in a case that the report of the channel state information is triggered by a third value of the field of the first information.

8. The communication method according to claim 7, further comprising:
receiving higher layer information including fourth information, wherein
the fourth information is used to indicate whether or not the report of the channel state information for a channel state information process is triggered by the first value of the field of the first information,
the fourth information is used to indicate whether or not the report of the channel state information for the channel state information process is triggered by the second value of the field of the first information, and
the fourth information is used to indicate whether or not the report of the channel state information for the channel state information process is triggered by the third value of the field of the first information.

9. The communication method according to claim 8, further comprising:
- reporting, using the physical uplink shared channel, the channel state information corresponding to a pair of a subframe set of the two subframe sets and the channel state information process in a case that the report of the channel state information is triggered by the first value of the field of the first information, the pair of the subframe set of the two subframe sets and the channel state information process being configured by using the third information and the fourth information,
- reporting, using the physical uplink shared channel, the channel state information corresponding to a pair of a subframe set of the two subframe sets and the channel state information process in a case that the report of the channel state information is triggered by the second value of the field of the first information, the pair of the subframe set of the two subframe sets and the channel state information process being configured by using the third information and the fourth information, and
- reporting, using the physical uplink shared channel, the channel state information corresponding to a pair of a subframe set of the two subframe sets and the channel state information process in a case that the report of the channel state information is triggered by the third value of the field of the first information, the pair of the subframe set of the two subframe sets and the channel state information process being configured by using the third information and the fourth information.

10. A communication method of a base station device that communicates with a terminal device, the communication method comprising:
- transmitting downlink control information including first information used to trigger a report of channel state information using a physical uplink shared channel, the downlink control information being used for scheduling of the physical uplink shared channel,
- transmitting higher layer information including second information used to indicate two subframe sets for a single downlink component carrier, and
- transmitting higher layer information including third information, wherein
- the third information is used to indicate for which subframe set of the two subframe sets the report of the channel state information is triggered in a case that the report of the channel state information is triggered by a first value of a field of the first information,
- the third information is used to indicate for which subframe set of the two subframe sets the report of the channel state information is triggered in a case that the report of the channel state information is triggered by a second value of the field of the first information, and
- the third information is used to indicate for which subframe set of the two subframe sets the report of the channel state information is triggered in a case that the report of the channel state information is triggered by a third value of the field of the first information.

11. The communication method according to claim 10, further comprising:
- transmitting higher layer information including fourth information, wherein
- the fourth information is used to indicate whether or not the report of the channel state information for a channel state information process is triggered by the first value of the field of the first information,
- the fourth information is used to indicate whether or not the report of the channel state information for the channel state information process is triggered by the second value of the field of the first information, and
- the fourth information is used to indicate whether or not the report of the channel state information for the channel state information process is triggered by the third value of the field of the first information.

12. The communication method according to claim 11, further comprising:
- receiving, using the physical uplink shared channel, the channel state information corresponding to a pair of a subframe set of the two subframe sets and the channel state information process in a case that the report of the channel state information is triggered by the first value of the field of the first information, the pair of the subframe set of the two subframe sets and the channel state information process being configured by using the third information and the fourth information, wherein
- receiving, using the physical uplink shared channel, the channel state information corresponding to a pair of a subframe set of the two subframe sets and the channel state information process in a case that the report of the channel state information is triggered by the second value of the field of the first information, the pair of the subframe set of the two subframe sets and the channel state information process being configured by using the third information and the fourth information, and
- receiving, using the physical uplink shared channel, the channel state information corresponding to a pair of a subframe set of the two subframe sets and the channel state information process in a case that the report of the channel state information is triggered by the third value of the field of the first information, the pair of the subframe set of the two subframe sets and the channel state information process being configured by using the third information and the fourth information.

* * * * *